US011494362B2

(12) United States Patent
Gerweck et al.

(10) Patent No.: US 11,494,362 B2
(45) Date of Patent: *Nov. 8, 2022

(54) DYNAMIC AGGREGATE GENERATION AND UPDATING FOR HIGH PERFORMANCE QUERYING OF LARGE DATASETS

(71) Applicant: Atscale, Inc., San Mateo, CA (US)

(72) Inventors: Sarah Gerweck, Santa Clara, CA (US); David Ross, San Francisco, CA (US)

(73) Assignee: AtScale, Inc., San Mateo, CA (US)

(*) Notice: Subject to any disclaimer, the term of this patent is extended or adjusted under 35 U.S.C. 154(b) by 167 days.

This patent is subject to a terminal disclaimer.

(21) Appl. No.: 16/732,648

(22) Filed: Jan. 2, 2020

(65) Prior Publication Data
US 2020/0142895 A1 May 7, 2020

Related U.S. Application Data

(63) Continuation of application No. 14/945,430, filed on Nov. 19, 2015, now Pat. No. 10,528,540.
(Continued)

(51) Int. Cl.
G06F 16/00 (2019.01)
G06F 16/22 (2019.01)
(Continued)

(52) U.S. Cl.
CPC ...... *G06F 16/2282* (2019.01); *G06F 16/2264* (2019.01); *G06F 16/244* (2019.01);
(Continued)

(58) Field of Classification Search
CPC .. G06F 16/283; G06F 16/284; G06F 16/2455; G06F 16/22; G06F 16/24542;
(Continued)

(56) References Cited

U.S. PATENT DOCUMENTS 6,684,207 B1 1/2004 Greenfield et al.
7,756,822 B2 7/2010 Danner et al.
(Continued)

OTHER PUBLICATIONS

Baralis et al., "Materialized View Selection in a Multidimensional Database," Proceedings of the 23rd VLDB Conference, Athens, Greece, 1997, pp. 156-165.
(Continued)

*Primary Examiner* — Yicun Wu
(74) *Attorney, Agent, or Firm* — Armis IP Law, LLC

(57) ABSTRACT

The present disclosure provides a detailed description of techniques used in systems, methods, and in computer program products for dynamic aggregate generation and updating for high performance querying of large datasets. Certain embodiments are directed to technological solutions for determining at least one aggregate of selected virtual cube attributes (e.g., measures, dimensions, etc.) describing a virtual multidimensional data model of a subject database, and generating an aggregate table and a set of aggregate metadata for the aggregate. In some embodiments, an aggregate database statement configured to operate on the subject database can be issued to generate the aggregate table and/or aggregate metadata. Further, the aggregate can be dynamically determined responsive to receiving a database statement configured to operate on the virtual multidimensional data model representing the subject database. Also, the aggregate table can comprise one or more partitions in an aggregate view to facilitate aggregate management and/or quality.

17 Claims, 17 Drawing Sheets

Related U.S. Application Data

(60) Provisional application No. 62/159,890, filed on May 11, 2015.

(51) Int. Cl.
| | |
|---|---|
| *G06F 16/2455* | (2019.01) |
| *G06F 16/2453* | (2019.01) |
| *G06F 16/242* | (2019.01) |
| *G06F 16/28* | (2019.01) |

(52) U.S. Cl.
CPC .. *G06F 16/24542* (2019.01); *G06F 16/24556* (2019.01); *G06F 16/283* (2019.01)

(58) Field of Classification Search
CPC .. G06F 16/248; G06F 16/221; G06F 16/2264; G06F 16/2379; G06F 16/24556; G06F 16/254; G06F 16/27; G06F 16/278; G06F 16/211; G06F 16/2435; G06F 16/273; G06F 16/289; G06F 16/24535; G06F 16/2282; G06F 16/244; G06F 16/2453; G06F 16/2465; G06F 21/00; G06F 21/6218; G06F 11/3664; G06F 16/2246; G06F 16/2272; G06F 16/24539; G06F 16/24564; G06F 16/2457; G06F 16/24573; G06F 16/24575; G06F 16/957; G06F 16/24578; G06F 16/2462; G06F 16/2471; G06F 16/26; G06F 16/285; G06F 2203/04802; G06F 2216/03; G06F 30/20; G06F 3/04815; G06F 3/04847; G06F 3/0485; G06F 16/21; G06F 16/212; G06F 16/2425; G06F 16/2445; G06F 16/24552; G06F 16/9574

See application file for complete search history.

(56) References Cited

U.S. PATENT DOCUMENTS

| | | |
|---|---|---|
| 8,010,554 B1 | 8/2011 | Zhou |
| 8,571,909 B2 | 10/2013 | Miller et al. |
| 9,330,091 B1 | 5/2016 | Stolte et al. |
| 9,477,691 B1 | 10/2016 | Reiner et al. |
| 9,529,892 B2 | 12/2016 | Tibrewal et al. |
| 9,600,554 B2 | 3/2017 | Gerweck et al. |
| 2004/0236767 A1 | 11/2004 | Soylemez et al. |
| 2005/0256912 A1 | 11/2005 | Krishnan et al. |
| 2005/0278290 A1 | 12/2005 | Bruce et al. |
| 2006/0036661 A1 | 2/2006 | Brennan |
| 2007/0208721 A1 | 9/2007 | Zaman et al. |
| 2008/0046481 A1 | 2/2008 | Gould et al. |
| 2009/0004885 A1 | 1/2009 | Komatsu |
| 2009/0018996 A1 | 1/2009 | Hunt et al. |
| 2009/0249125 A1 | 10/2009 | Bhatawdekar et al. |
| 2011/0252049 A1 | 10/2011 | Marinescu et al. |
| 2012/0089564 A1 | 4/2012 | Bakalash et al. |
| 2012/0102453 A1 | 4/2012 | Patch et al. |
| 2014/0163944 A1 | 6/2014 | Jiang et al. |
| 2014/0258930 A1 | 9/2014 | Colle et al. |
| 2015/0278334 A1 | 10/2015 | Gerweck et al. |

OTHER PUBLICATIONS

Harinarayan et al., "Implementing Data Cubes Efficiently," SIGMOD '96 Jun. 1996, ACM, Montreal, Canada, 1996, pp. 205-216.

https://451research.com/report-short?entityId=92407, 451 Research Impact Report, "Kyvos adds SQL support, availability on Google Cloud for OLAP-on-Hadoop" May 8, 2017, 1 page.

https://www.ibm.com/support/knowledgecenter/en/ssw_i5_54/rzajq/rzajqdispatcher.htm, "Query Dispatcher", downloaded May 2, 2017, 1 page.

https://www.slideshare.net/AtulSharma225/kyvos-insights-datasheet-60646546 "Kyvos insights", Apr. 8, 2016, 2 pages.

International Preliminary Report & Written Opinion of PCT Application No. PCT/US2015/0022082, dated Jun. 25, 2015, 3 pages total.

International Search Report & Written Opinion of PCT Application No. PCT/US2016/031684, dated Nov. 23, 2017, 6 pages total.

International Search Report & Written Opinion of PCT Application No. PCT/US2016/031684, dated Oct. 19, 2016, 6 pages total.

DYNAMIC AGGREGATE GENERATION AND UPDATING FOR HIGH PERFORMANCE QUERYING OF LARGE DATASETS

RELATED APPLICATIONS

This application is a continuation of U.S. patent application Ser. No. 14/945,430 titled, "DYNAMIC AGGREGATE GENERATION AND UPDATING FOR HIGH PERFORMANCE QUERYING OF LARGE DATASETS", filed Nov. 19, 2015, the entire teachings of which is incorporated by reference in its entirety.

U.S. patent application Ser. No. 14/945,430 claims the benefit of priority to U.S. Patent Application Ser. No. 62/159,890 titled, "HIGH PERFORMANCE QUERYING OF LARGE DATASETS USING DYNAMIC AGGREGATE GENERATION AND UPDATING", filed May 11, 2015, which is hereby incorporated by reference in its entirety.

FIELD

This disclosure relates to the field of data analytics, and more particularly to techniques for dynamic aggregate generation and updating for high performance querying of large datasets.

BACKGROUND

With the continued proliferation of information sensing devices (e.g., mobile phones, online computers, RFID tags, sensors, etc.), increasingly larger volumes of data are collected for various business intelligence purposes. For example, the web browsing activities of online users are captured in various datasets (e.g., cookies, log files, etc.) for use by online advertisers in targeted advertising campaigns. Data from operational sources (e.g., point of sale systems, accounting systems, CRM systems, etc.) can also be combined with the data from online sources. Relying on traditional database structures (e.g., relational) to store such large volumes of data can result in database statements (e.g., queries) that are complex, resource-intensive, and time consuming. Deploying multidimensional database structures enables more complex database statements to be interpreted (e.g., executed) with substantially less overhead. Some such multidimensional models and analysis techniques (e.g., online analytical processing or OLAP) allow a user (e.g., business intelligence analyst) to view the data in "cubes" comprising multiple dimensions (e.g., product name, order month, etc.) and associated cells (e.g., defined by a combination of dimensions) holding a value that represents a measure (e.g., sale price, quantity, etc.). Further, with such large volumes of data from varying sources and with varying structures (e.g., relational, multidimensional, delimited flat file, document, etc.), the use of data warehouses and distributed file systems (e.g., Hadoop distributed file system or HDFS) to store and access data has increased. For example, an HDFS can be implemented for databases having a flat file structure with predetermined delimiters, and associated metadata (e.g., describing the keys for the respective delimited data values), to accommodate a broad range of data types and structures. Various query languages and query engines (e.g., Impala, SparkSQL, Tez, Drill, Presto, etc.) are available to users for querying data stored in data warehouses and/or distributed file systems.

Such distributed file systems, however, can be "append only" stores and can comprise fact tables with over a billion rows. Further, these stores are continually being modified (e.g., new rows appended) with new data, raising challenges related to data quality (e.g., "freshness", accuracy, etc.). The users of such large datasets therefore desire to query the datasets with a high level of performance, characterized by fast query response times and accurate query results, across various query engines and data storage environments. Some legacy approaches for querying such large datasets can directly query the full dataset with available query languages and query engines. However, such queries can take minutes and sometimes hours to execute, not only lacking the desired fast query response times, but also expending costly computing resources and human resources. Other legacy approaches can store historical query results (e.g., multidimensional cell results) in a query cache for later use. While this approach can improve query performance when new queries are matched to the cached query results, this approach can be limited in query result quality (e.g., the most recent or fresh data are not in the cached results) and also limited in query response time (e.g., the new query does not match the cached results, the cached results have become large and time consuming to query, etc.). The aforementioned legacy approaches can further be limited in the ability to operate across a variety of query languages and query engines.

The problem to be solved is rooted in technological limitations of the legacy approaches. Improved techniques, and in particular, improved application of technology is needed to address the problem of fast and high quality querying of large datasets across a variety of data storage environments. More specifically, the technologies applied in the aforementioned legacy approaches fail to achieve the sought after capabilities of the herein disclosed techniques for dynamic aggregate generation and updating for high performance querying of large datasets, thus techniques are needed to improve the application and efficacy of various technologies as compared with the legacy approaches.

SUMMARY

The present disclosure provides improved systems, methods, and computer program products suited to address the aforementioned issues with legacy approaches. More specifically, the present disclosure provides a detailed description of techniques used in systems, methods, and in computer program products to provide dynamic aggregate generation and updating for high performance querying of large datasets. Certain embodiments are directed to technological solutions for dynamically generating and updating views, tables, partitions, and/or metadata for one or more selected aggregates derived from a virtual multidimensional data model of a subject database to facilitate high performance (e.g., fast response time, high quality, etc.) querying of the subject database, which embodiments advance the technical fields for addressing the problem of fast and high quality querying of large datasets across a variety of data storage environments, as well as advancing peripheral technical fields. The disclosed embodiments modify and improve over conventional approaches. In particular, practice of the disclosed techniques reduces use of computer memory, reduces demand for computer processing power, and reduces communication overhead needed for fast and high quality queries of large datasets across various data storage environments. Some embodiments disclosed herein use techniques to improve the functioning of multiple systems within the disclosed environments.

In some embodiments, dynamic aggregate generation and updating for high performance querying of large datasets can be implemented by determining at least one aggregate of selected virtual cube attributes (e.g., measures, dimensions, etc.) describing a virtual multidimensional data model of a subject database, generating an aggregate table for the aggregate comprising aggregated data from the subject database, and generating a set of aggregate metadata comprising one or more aggregate attributes characterizing the aggregate table. In one or more embodiments, an aggregate database statement configured to operate on the subject database can be issued to generate the aggregate table and/or aggregate metadata. In some embodiments, an aggregate object corresponding to the aggregate and comprising aggregate query attributes can be used to develop a subject database statement that can access the aggregate table and/or the aggregate metadata. Further, the aggregate can be dynamically determined responsive to receiving a database statement configured to operate on the virtual multidimensional data model representing the subject database. Also, the aggregate table can comprise one or more partitions in an aggregate view to facilitate aggregate management and/or quality.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

The drawings described below are for illustration purposes only. The drawings are not intended to limit the scope of the present disclosure.

DETAILED DESCRIPTION

Figure 1A:
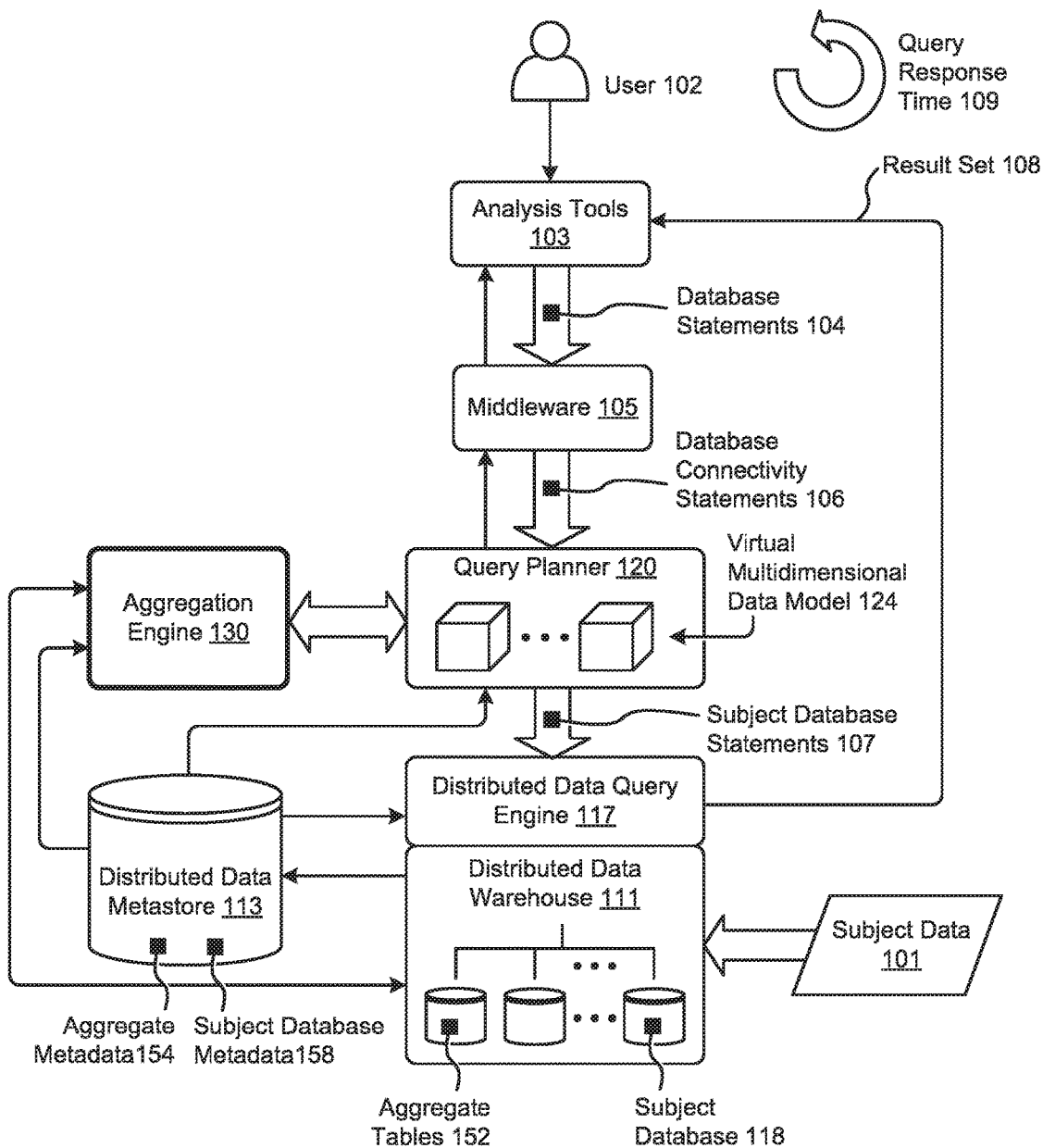
FIG. 1A depicts a diagram illustrating techniques for dynamic aggregate generation and updating for high performance querying of large datasets, according to an embodiment.

Some embodiments of the present disclosure address the problem of fast and high quality querying of large datasets across a variety of data storage environments and some embodiments are directed to approaches for dynamically generating and updating views, tables, partitions, and/or metadata for one or more selected aggregates derived from a virtual multidimensional data model of a subject database to facilitate high performance (e.g., fast response time, high quality, etc.) querying of the subject database. More particularly, disclosed herein and in the accompanying figures are exemplary environments, systems, methods, and computer program products for implementing dynamic aggregate generation and updating for high performance querying of large datasets.

Overview

With the continued proliferation of information sensing devices (e.g., mobile phones, online computers, RFID tags, sensors, etc.), increasingly larger volumes of data are collected for various business intelligence purposes. Relying on traditional database structures (e.g., relational) to store such large volumes of data can result in database statements (e.g., queries) that are complex, resource-intensive, and time consuming. Deploying multidimensional database structures enables more complex database statements to be interpreted (e.g., executed) with substantially less overhead. Further, with such large volumes of data from varying sources and with varying structures (e.g., relational, multidimensional, delimited flat file, document, etc.), the use of data warehouses and distributed file systems (e.g., Hadoop distributed file system or HDFS) to store and access data has increased. Various query languages and query engines (e.g., Impala, SparkSQL, Tez, Drill, Presto, etc.) are available to users for querying data stored in data warehouses and/or distributed file systems.

Such distributed file systems, however, can be "append only" stores and can comprise fact tables with over a billion rows. Further, these stores are continually being modified (e.g., new rows appended) with new data, raising challenges related to data quality (e.g., "freshness", accuracy, etc.). The users of such large datasets therefore desire to query the datasets with a high level of performance, characterized by fast query response times and accurate query results, across various query engines and data storage environments. Some legacy approaches for querying such large datasets can directly query the full dataset with available query languages and query engines, taking minutes and sometimes hours to execute. Other legacy approaches can store historical query results (e.g., multidimensional cell results) in a query cache for later use, yet can be limited in query result quality (e.g., the most recent or fresh data are not in the cached results) and also limited in query response time (e.g., the new query does not match the cached results, the cached results have become large, etc.). The aforementioned legacy approaches can further be limited in the ability to operate across a variety of query languages and query engines.

The problem to be solved is rooted in technological limitations of the legacy approaches. Improved techniques, and in particular, improved application of technology is needed to address the problem of fast and high quality querying of large datasets across a variety of data storage environments. More specifically, the technologies applied in the aforementioned legacy approaches fail to achieve the sought after capabilities of the herein disclosed techniques for dynamic aggregate generation and updating for high performance querying of large datasets. Techniques are therefore needed to improve the application and efficacy of various technologies as compared with the legacy approaches.

To address the need for fast and high quality queries of large datasets across various data storage environments, the techniques described herein determine one or more aggregates derived from a virtual multidimensional data model of a subject database, and dynamically generate aggregate views, tables, partitions, and/or metadata that can be used at query time to develop high performance subject database statements (e.g., queries). The aggregates represent certain raw data sets in the subject database referenced by one or more virtual cube attributes (e.g., measures, dimensions, etc.) of the virtual multidimensional data model by a single data object and/or smaller set of data objects. By accessing the smaller aggregate views in some or all of the query, the query response time is significantly reduced as compared to the query response time when accessing the full underlying datasets. The aggregate views, tables, partitions, and/or metadata can be continually maintained (e.g., updated) to further provide high quality (e.g., up-to-date) query results. Various embodiments as disclosed herein serve to improve the functioning of computing and storage systems by reducing the processing resources and storage footprint needed by legacy approaches. For example, the extensive computing resources for direct querying of the full dataset, as well as the storage capacity for caching a broad range of query results, are not required with the herein disclosed techniques.

Various embodiments are described herein with reference to the figures. It should be noted that the figures are not necessarily drawn to scale and that the elements of similar structures or functions are sometimes represented by like reference numerals throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A depicts a diagram 1A00 illustrating techniques for dynamic aggregate generation and updating for high performance querying of large datasets, according to an embodiment. As an option, one or more instances of diagram 1A00 or any aspect thereof may be implemented in the context of the architecture and functionality of the embodiments described herein. Also, the diagram 1A00 or any aspect thereof may be implemented in any desired environment.

As shown in FIG. 1A, diagram 1A00 shows a user 102 (e.g., business intelligence analyst) interacting with certain instances of analysis tools 103 (e.g., Tableau, Excel, QlikView, etc.) that can generate various instances of database statements 104 to be interpreted on associated datasets. In some cases, the user 102 may want to perform analyses on a set of subject data 101 (e.g., mobile activity, social network activity, transactions, CRM activity, etc.) that is stored in a subject database 118 (e.g., as flat file data, multidimensional data, etc.) in a distributed data warehouse 111. The structure of the subject database 118 can be specified by certain attributes (e.g., database definitions, schema definitions, etc.) comprising certain instances of subject database metadata 158 in a distributed data metastore 113. As an example, the distributed data warehouse 111 can be configured to conform to the HDFS framework and the distributed data metastore 113 can be a Hive metastore. In such cases, the database statements 104 from the analysis tools 103 are conformed to database connectivity statements 106 (e.g., using ODBC, JDBC, OLE-DB, etc.) by an instance of middleware 105. The database connectivity statements 106 can then be delivered to a query planner 120 to produce associated instances of subject database statements 107 that can be issued to a distributed data query engine 117 for operation on the subject database 118. In an exemplary embodiment, the database statements 104 can be configured to operate on a virtual multidimensional data model 124 and/or some representation of the virtual multidimensional data model 124. Specifically, the virtual multidimensional data model 124 comprises one or more logical representations (e.g., virtual cubes) of the subject database 118 that can be presented to the user 102 to facilitate a broad range of analyses of the underlying data (e.g., subject data 101). The database statements 104 configured for the virtual multidimensional data model 124 can be received by the query planner 120 to produce associated instances of subject database statements 107 that can be issued to the distributed data query engine 117. In one or more embodiments, the distributed data query engine 117 can be a Structured Query Language (SQL) based query engine for accessing distributed file systems (e.g., Impala, SparkSQL, Tez, Drill, Presto, etc.). Other query engine configurations and partitions are possible.

For large sets of subject data 101 stored in the subject database 118, a query response time 109 to return a result set 108 can be long (e.g., several minutes to hours). The approach shown in diagram 1A00 and described herein for enabling high performance querying of the subject database 118 comprising a large set of subject data 101, uses an aggregation engine 130 to determine one or more aggregates from the virtual multidimensional data model 124 representing the subject database 118. The aggregation engine 130 can further generate instances of aggregate tables 152 and/or aggregate metadata 154 associated with the aggregates. The aggregates represent certain raw data sets in the subject database 118 referenced by corresponding attributes (e.g., measures, dimensions, etc.) of the virtual multidimensional data model 124 by a single aggregated data object (e.g., value) and/or aggregated data sets having fewer objects than the raw data sets. Such aggregate information can then be used to reduce the query response time 109 by facilitating access to the smaller aggregate tables in some or all of the query comprising the subject database statements 107. In some embodiments, the aggregate tables 152 and/or aggregate metadata 154 can be available to the user 102 to include in the database statements 104 developed by the user 102. In other embodiments, the query planner 120 can use the aggregate tables 152 and/or aggregate metadata 154 at query time to generate subject database statements 107 that exhibit high performance. The aggregation engine 130 can further dynamically generate (e.g., by heuristic techniques, machine learning techniques, etc.) new aggregates (e.g., tables, partitions, metadata, etc.) and/or update existing aggregates, to continually improve query performance (e.g., response times, response accuracy, etc.). One embodiment of a system for implementing the herein disclosed techniques for dynamic aggregate generation and updating for high performance querying of large datasets is described as pertains to FIG. 1B.

Figure 1B:
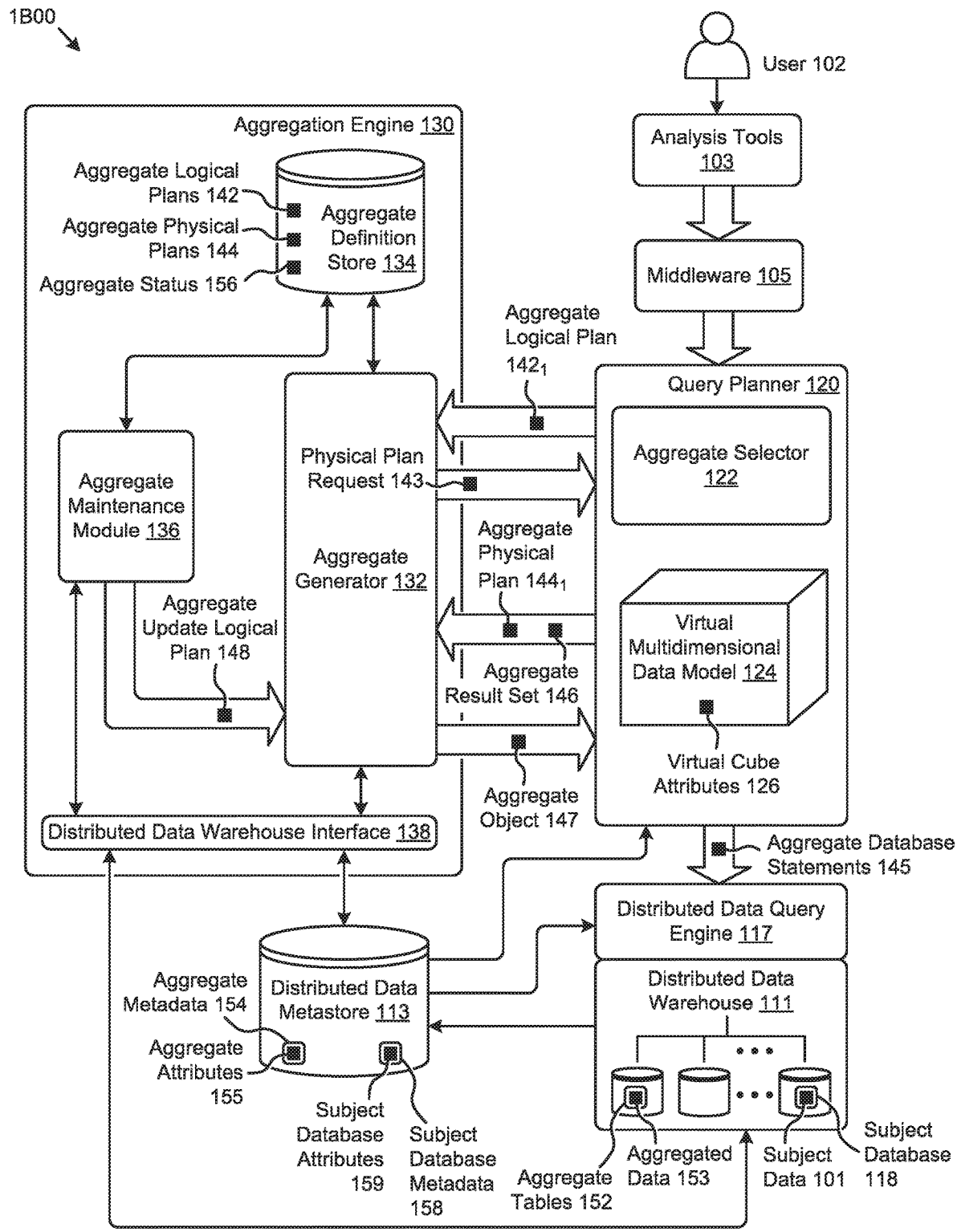
FIG. 1B shows a block diagram of a system implementing dynamic aggregate generation and updating for high performance querying of large datasets, according to an embodiment.

FIG. 1B shows a block diagram 1B00 of a system implementing dynamic aggregate generation and updating for high performance querying of large datasets, according to an embodiment. As an option, one or more instances of block diagram 1B00 or any aspect thereof may be implemented in the context of the architecture and functionality of the embodiments described herein. Also, the block diagram 1B00 or any aspect thereof may be implemented in any desired environment.

The block diagram 1B00 illustrates an embodiment of the herein disclosed techniques for dynamic aggregate generation and updating for high performance querying of large datasets. As shown, block diagram 1B00 comprises the components described in FIG. 1A with more details to further describe the herein disclosed techniques and approach. Other components and/or operation partitioning are possible. Specifically, the aggregation engine 130 is shown to further comprise an aggregate generator 132, an aggregate definition store 134, an aggregate maintenance module 136, and a distributed data warehouse interface 138. The query planner 120 is also shown to further comprise an aggregate selector 122. Various data flows, data structures, and data messages among the components in the block diagram 1B00 are also shown. More specifically, the aggregate selector 122 can determine one or more aggregates to be generated and maintained by the aggregation engine 130. For example, the aggregates identified by the aggregate selector 122 can be associated with certain databases (e.g., the subject database 118) available to the user 102. The aggregates can be determined by the aggregate selector 122 by various techniques, such as heuristic techniques for improving query performance based on various criteria and/or information (e.g., user-defined aggregates, query history, query and/or performance statistics, rules, etc.). In an exemplary embodiment, the aggregate selector 122 can determine aggregates based in part on various instances of virtual cube attributes 126 comprising the virtual multidimensional data model 124. In some embodiments, the virtual cube attributes 126 can characterize one or more virtual multidimensional data cubes (e.g., virtual cubes) having certain dimensions, measures, relationships (e.g., explicit, inferred, etc.), dependencies, and/or other attributes associated with the subject data 101. For example, the virtual cube attributes 126 can be based in part on a set of subject database attributes 159 comprising the subject database metadata 158. In some cases, aggregates derived from the virtual multidimensional data model 124 can be generated and/or maintained (e.g., checked for validity, updated, rebuilt, etc.) independent of changes to the structure of the underlying database (e.g., subject database 118).

Further details related to generation and use of a virtual multidimensional data model are disclosed in U.S. patent application Ser. No. 14/665,032, entitled "INTERPRETING RELATIONAL DATABASE STATEMENTS USING A VIRTUAL MULTIDIMENSIONAL DATA MODEL" filed on Mar. 23, 2015, the contents of which is hereby incorporated by reference in its entirety in the present application.

The aggregate generator 132 can then receive an aggregate logical plan $142_1$ from the query planner 120 associated with a certain instance of the aggregates identified by the aggregate selector 122. The aggregate logical plan $142_1$ (e.g., represented in programming code objects) can comprise various attributes describing a query structure and strategy (e.g., aggregation type, virtual cube references, joins, unions, sequencing, etc.) to be evaluated on the database to facilitate generating and/or updating the identified aggregate. The aggregate generator 132 can then store the aggregate logical plan $142_1$ as an instance of the aggregate logical plans 142 in the aggregate definition store 134. The aggregate generator 132 can further issue a physical plan request 143 to the query planner 120. Specifically, the physical plan request 143 invokes the generation of an aggregate physical plan 144$_1$ corresponding to the aggregate logical plan 142$_1$. For example, the aggregate physical plan 144$_1$ can correspond to an instance of the aggregate database statements 145 conforming to a query language that can be executed by the distributed data query engine 117 on the subject database 118 to return an aggregate result set 146. The aggregate physical plan 144$_1$ can be received by the aggregate generator 132 and stored as an instance of the aggregate physical plans 144 in the aggregate definition store 134. The aggregate result set 146 can further be received by the aggregate generator 132 and used to create one or more instances of the aggregate tables 152. The aggregate result set 146 can also be used to create and/or update the aggregate metadata 154. For example, the aggregate tables 152 can be physical tables, with or without partitions, comprising sets of aggregated data 153 and stored in the distributed data warehouse 111. Also, for example, the aggregate metadata 154 can comprise various aggregate attributes 155 (e.g., table names, locations, schema, view definitions, etc.) describing the aggregate tables 152 and various associations among the tables and/or partitions of the tables. Further, the data format and structure of the aggregate tables 152 and/or the aggregate metadata 154 are configurable to operate in a variety of data storage environments and with a variety of components (e.g., query engines such as Impala, SparkSQL, Tez, Drill, Presto, etc.). The aggregate result set 146 can further be used to generate an aggregate object 147 comprising aggregate query attributes that is delivered to the query planner 120 to be used at query time to generate subject database statements 107 that use the aggregate tables and/or metadata to exhibit high performance. For example, the aggregate object 147 can be a serialized object (e.g., JSON string) comprising aggregate query attributes relating to the aggregate logical plan 142$_1$, the aggregate physical plan 144$_1$, the aggregate tables 152, the aggregate metadata 154, and/or other information. The aggregate object 147 can further be organized as an XML document, or any other possible structure. In embodiments implementing virtual multidimensional data models to represent the subject data 101, such aggregate objects can be readily applied at query time due to the rich relationship information (e.g., dependencies, equivalences, etc.) comprising the virtual multidimensional data models. For example, such rich information can facilitate the inference of functional dependencies that, in turn, can invoke the use of certain aggregates and/or inclusion of certain attributes in one or more aggregates. An aggregate status 156 describing various attributes (e.g., activated, deactivated, etc.) pertaining to the status of the aggregate tables 152 and/or the aggregate metadata 154 can be stored in the aggregate definition store 134.

The aggregate maintenance module 136 performs various maintenance operations as pertains to the aggregate tables 152 and the aggregate metadata 154, to enable continual use of such aggregate information to develop and execute high performance queries. Specifically, the aggregate maintenance module 136 can use the aggregate status 156, the state of the aggregate tables 152 and/or the aggregate metadata 154, and/or other information, to take certain actions, such as aggregate validation, updating, deactivation, activation, removal, and/or other operations. In some cases, the aggregate maintenance module 136 can deliver one or more instances of an aggregate update logical plan 148 to the aggregate generator 132 to facilitate updating corresponding instances of aggregate tables 152 and/or aggregate metadata 154. A use model (e.g., executed by user 102) for the approach shown in diagram 1A00 and system shown in block diagram 1B00 is described as pertains to FIG. 1C.

Figure 1C:
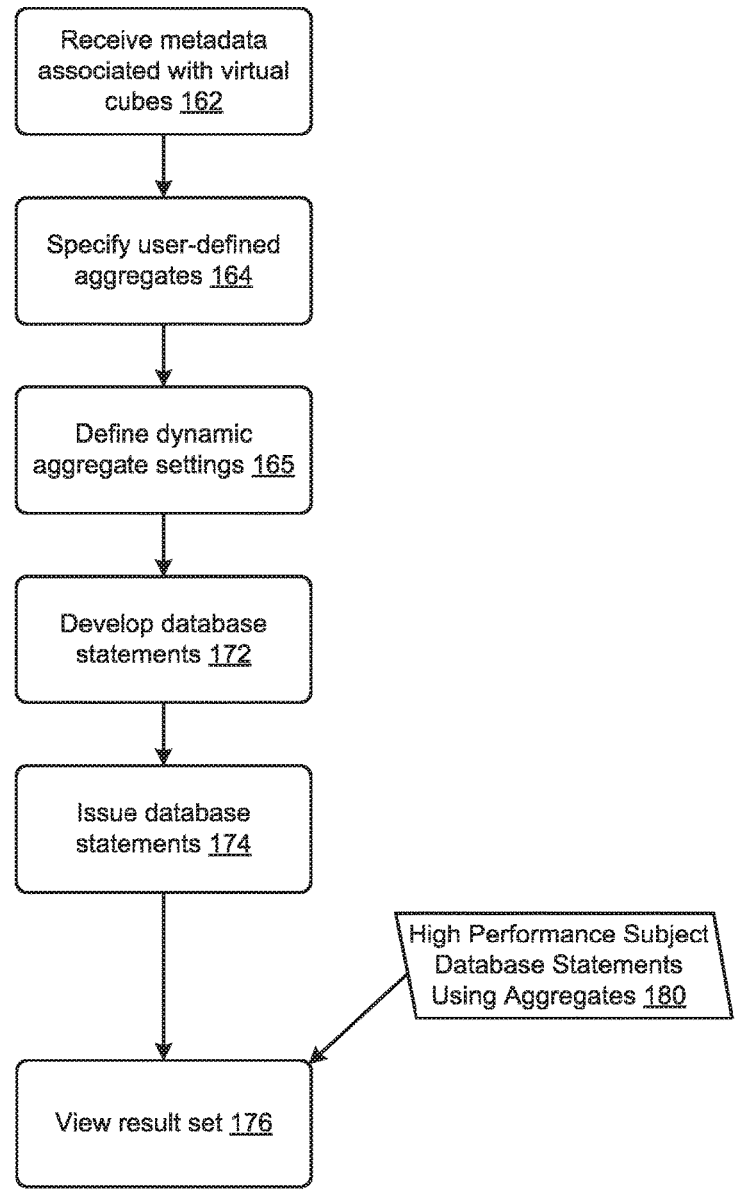
FIG. 1C is a use model for a system implementing dynamic aggregate generation and updating for high performance querying of large datasets, according to an embodiment.

FIG. 1C is a use model 1C00 for a system implementing dynamic aggregate generation and updating for high performance querying of large datasets, according to an embodiment. As an option, one or more instances of use model 1C00 or any aspect thereof may be implemented in the context of the architecture and functionality of the embodiments described herein. Also, the use model 1C00 or any aspect thereof may be implemented in any desired environment.

As shown in FIG. 1C, the use model 1C00 can commence with a user receiving metadata associated with one or more virtual cubes comprising a multidimensional data model of a subject database the user would like to analyze (see step 162). For example, a flattened relational database representation of the virtual cubes can be presented to the user by certain analysis tools for developing and issuing database statements. In some embodiments, the user can optionally specify certain aggregates associated with the virtual cubes and/or underlying subject database (see step 164). For example, such user-defined aggregates can be generated according to the herein disclosed techniques. In other cases, the herein disclosed techniques can dynamically generate aggregates based at least in part on settings defined by the user (see step 165). For example, the user can establish certain dynamic aggregate settings such as aggregate table locations, aggregate table update periods, out-of-order data resample times (e.g., "grace period"), aggregate table partition parameters, aggregate prediction rules, and other settings. In some embodiments, the user can specify whether aggregates are preferred to be used and to what extent. Database statements can then be developed by the user based on the received metadata (see step 172) and issued for processing (see step 174). In such cases, user-defined aggregates and/or dynamically generated aggregates can be used to produce high performance subject database statements (see input 180) to improve the performance of the database statement execution. After issuing the database statements, the user can view the result set (see step 176).

Figure 2:
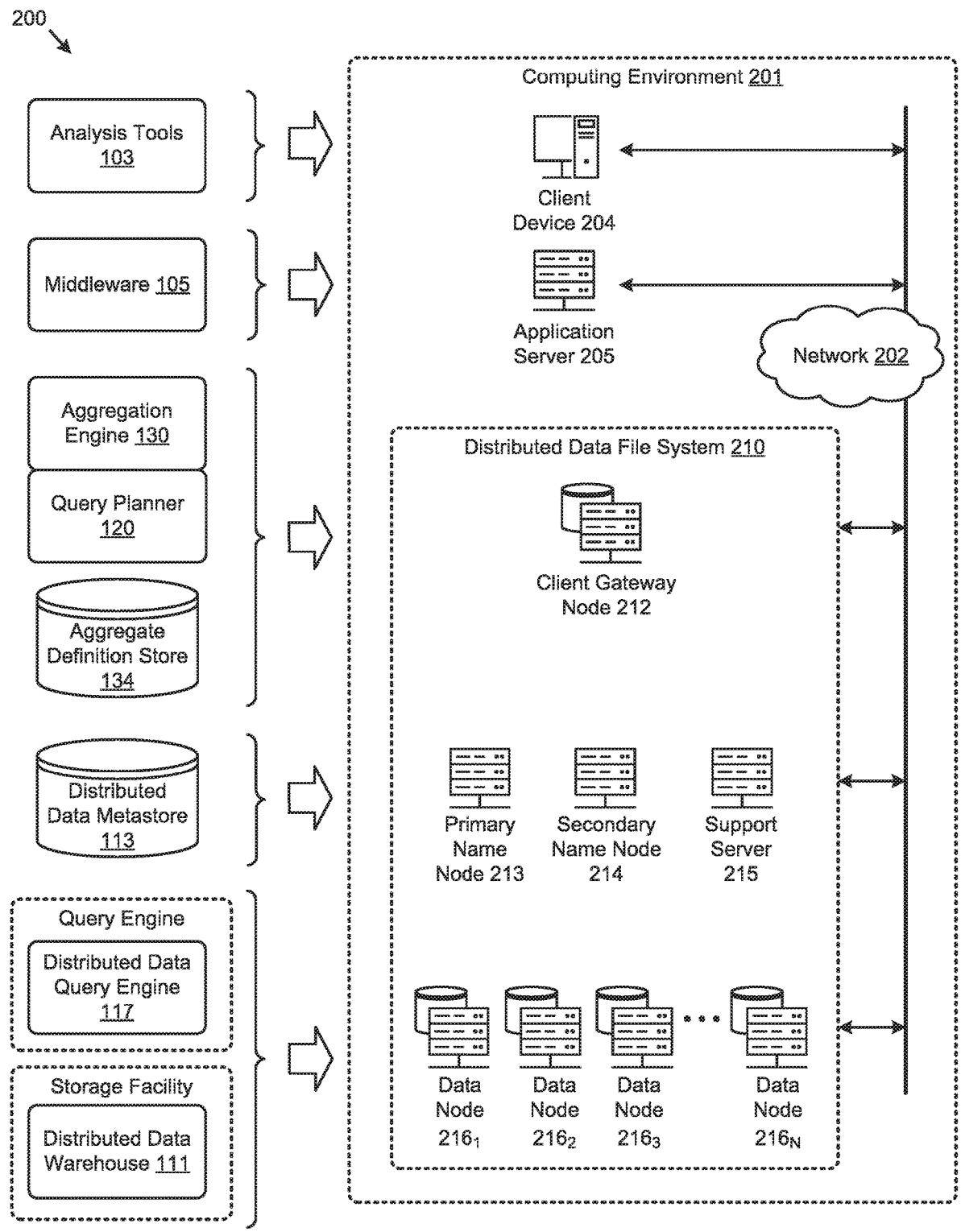
FIG. 2 is a schematic of an environment for implementing a system implementing dynamic aggregate generation and updating for high performance querying of large datasets, according to an embodiment.

One embodiment of an environment for implementing the foregoing use model and herein disclosed techniques is described in FIG. 2.

FIG. 2 is a schematic 200 of an environment for implementing a system implementing dynamic aggregate generation and updating for high performance querying of large datasets, according to an embodiment. As an option, one or more instances of schematic 200 or any aspect thereof may be implemented in the context of the architecture and functionality of the embodiments described herein. Also, the schematic 200 or any aspect thereof may be implemented in any desired environment.

As shown in FIG. 2, a computing environment 201 comprises one or more instances of a client device 204 (e.g., a desktop computer), one or more instances of an application server 205, and one or more instances of a distributed data file system 210. The aforementioned devices, servers, and systems can communicate through a network 202 (e.g., a wireless network, a wide area network (WAN), a local area network (LAN), the Internet, an intranet, a private network, etc.). More specifically, the distributed data file system 210 can be configurable to store and process large volumes of data (e.g., in an HDFS framework) and comprise one or more instances of a client gateway node 212, one or more instances of a primary name node 213, one or more instances of a secondary name node 214, one or more instances of a support server 215 (e.g., executing data analysis processes, etc.), and a plurality of data nodes (e.g., data node $216_1$, data node $216_2$, data node $216_3$, to data node $216_N$). The distributed data file system 210 can be configured to store program files of data across multiple computing devices (e.g., the plurality of data nodes), rather than store all of the files on a single computing device with a large amount of storage capacity. To accommodate such distributed storage, the plurality of data nodes can be configured with one or more rack-mounted servers coupled (e.g., by SATA or SAS interconnects) to multiple solid-state drives (SSDs) and/or hard disk drives (HDDs) for storing the data. As an example, when a file is loaded into distributed data file system 210, it is replicated and partitioned into "blocks" of data, which are distributed and stored across the plurality of data nodes. The primary name node 213 is responsible for storage and management of metadata associated with the distributed data file system 210, such that, for example, the primary name node 213 can provide data location information for data processing operations. Further, other configurations, partitions, and architectures of the distributed data file system 210 shown in computing environment 201 are possible. For example, a single-node implementation may have all of the nodes (e.g., client gateway node 212, primary name node 213, the plurality of data nodes, etc.) reside on a single computing device. Also, a small cluster of two nodes may have a first computing device operate as a name node and a second computing device operate as a data node. Further, the distributed data file system 210 can represent any database management system.

In one or more embodiments, the aforementioned devices, servers, and systems in computing environment 201 can be configured to implement techniques for dynamic aggregate generation and updating for high performance querying of large datasets as described in FIG. 1A and herein. Specifically, the schematic 200 associates the components described in FIG. 1A with the client device 204, the application server 205, and the distributed data file system 210 of computing environment 201. More specifically, as shown in FIG. 2, the client device 204 (e.g., operated by user 102) can store program instructions corresponding to the operations of the analysis tools 103. Also, the application server 205 in computing environment 201 can store program instructions corresponding to the operations of the middleware 105. Further, the client gateway node 212 can store program instructions corresponding to the operations of the aggregation engine 130 and the query planner 120. In some embodiments, the operations of the middleware 105 can also be executed by the query planner 120 on the client gateway node 212. The aggregate definition store 134 can also be stored in a storage facility (e.g., one or more SSDs and/or HDDs) coupled to the client gateway node 212. Further, the distributed data metastore 113 can be stored in a storage facility (e.g., one or more SSDs and/or HDDs) coupled to the primary name node 213. The data and databases distributed across the plurality of data nodes can be operated over by a query engine such as distributed data query engine 117 that communicates with a storage facility such as the distributed data warehouse 111.

Various aspects of the herein disclosed techniques are described in further detail as follows.

Figure 3A:
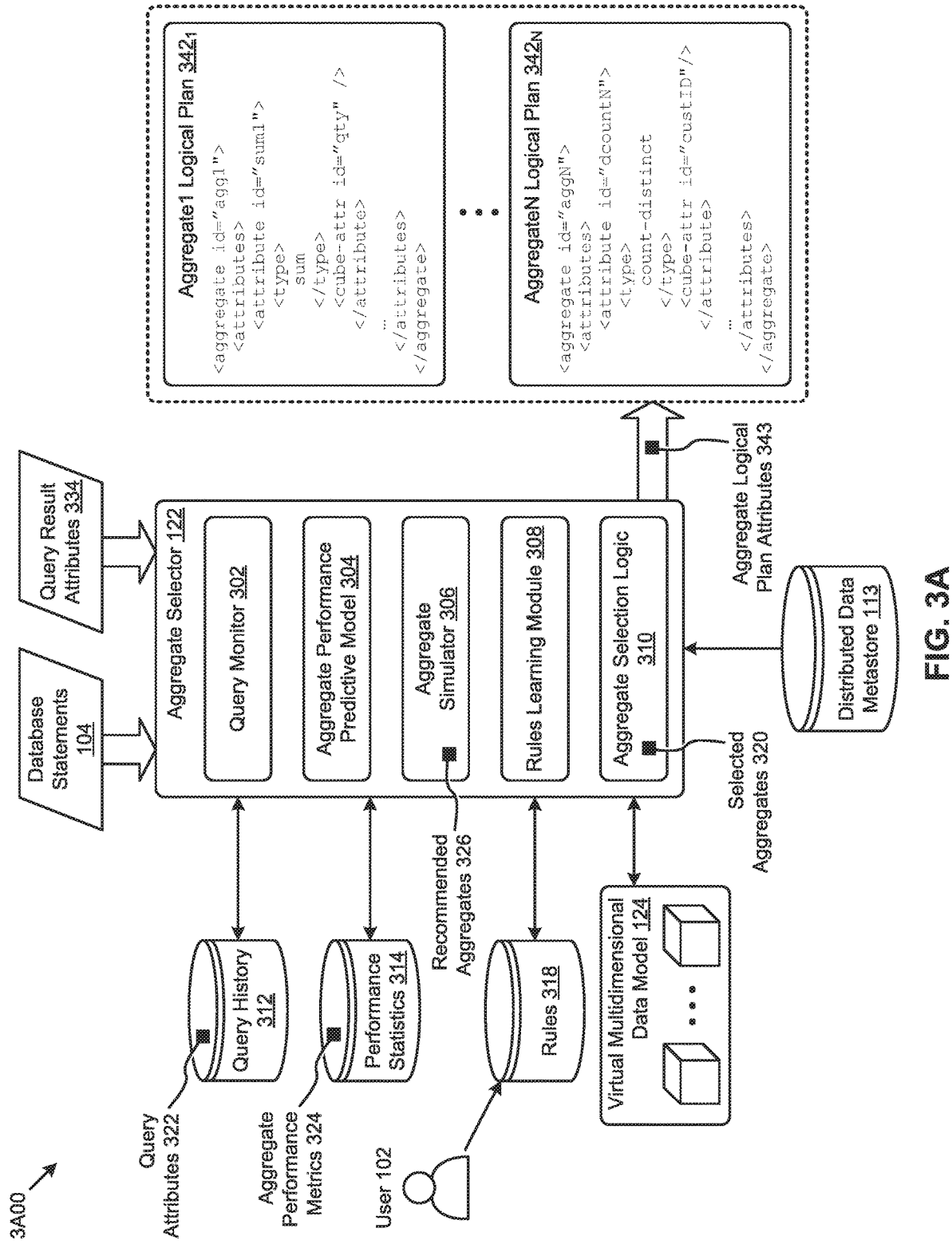
FIG. 3A depicts an aggregate selection subsystem for selecting aggregates in systems implementing dynamic aggregate generation and updating for high performance querying of large datasets, according to some embodiments.

FIG. 3A depicts an aggregate selection subsystem 3A00 for selecting aggregates in systems implementing dynamic aggregate generation and updating for high performance querying of large datasets, according to an embodiment. As an option, one or more instances of aggregate selection subsystem 3A00 or any aspect thereof may be implemented in the context of the architecture and functionality of the embodiments described herein. Also, the aggregate selection subsystem 3A00 or any aspect thereof may be implemented in any desired environment.

FIG. 3A depicts one embodiment of an aggregate selection subsystem 3A00 for determining one or more aggregates to generate according to the techniques disclosed herein. Specifically, the aggregate selection subsystem 3A00 can comprise an instance of the aggregate selector 122 further comprising a query monitor 302, an aggregate performance predictive model 304, an aggregate simulator 306, a rules learning module 308, and a set of aggregate selection logic 310. The function of the query monitor 302 is to monitor database access interactivity (e.g., queries, results, etc.) to extract various information used by the aggregate selection subsystem 3A00. For example, the query monitor 302 might intercept any or all of the database statements 104 to build a query history 312 comprising the query attributes 322 associated with the stream of incoming queries. In some cases, the query attributes 322 might characterize the calculations required for a given query. In other cases, the query attributes 322 can comprise the basis attributes for a given query, which, for example, can characterize the dimensionality of the query. The query monitor 302 might further detect certain instances of query result attributes 334 (e.g., execution time, response time, dataset size, etc.).

The query history 312, the query result attributes 334, and/or other information can be used to form the aggregate performance predictive model 304. Such a predictive model can be used to determine certain instances of performance statistics 314 for use by the aggregate selection subsystem 3A00. For example, the aggregate performance predictive model 304 might be used to generate an instance of aggregate performance metrics 324 for a given existing aggregate. The aggregate performance metrics 324 and/or other types of performance statistics 314 can be used by the aggregate selector 122 to identify aggregates to be generated.

The aggregate performance predictive model 304 can further be used by the aggregate simulator 306 to estimate the performance gain (e.g., aggregate score, response time improvement, size and/or row reduction, etc.) of certain instances of recommended aggregates 326. For example, the aggregate simulator 306 might analyze the sequence of queries captured in the query history 312 to identify certain aggregates and/or views that might improve the performance of queries later issued. The aggregate simulator 306 might then apply the aggregate attributes characterizing the recommended aggregates 326 to the aggregate performance predictive model 304 to predict one or more performance metrics corresponding to the recommended aggregates 326. In some cases, the performance metric can be a relative metric (e.g., ratio of row count) comparing the performance of an incoming query utilizing the one or more instances of the recommended aggregates 326 to the performance of the incoming query without utilizing the one or more instances of the recommended aggregates 326. The predicted performance metrics associated with the various instances of recommended aggregates 326 can be stored as instances of performance statistics 314 for use by the aggregate selection subsystem 3A00.

In one or more embodiments, the aggregate selection logic 310 can apply incoming instances of the database statements 104, the query history 312, the performance statistics 314, and/or other information to a set of rules 318 to heuristically determine one or more instances of selected aggregates 320 to be generated according to the herein disclosed techniques. For example, the rules 318 might comprise a set of values (e.g., thresholds) to compare to a corresponding set of attributes (e.g., performance metrics, record size, distinct count, fractional reduction, performance score, redundancy, relative performance gain, etc.) for the recommended aggregates 326 to determine which of the recommended aggregates 326 should be identified as selected aggregates 320. The rules 318 might further comprise various logic associated with the query strategy and/or structure for generating a selected aggregate. For example, certain selected aggregates might require a JOIN, yet other selected aggregates might require a UNION. The aggregate simulator 306 can also use the rules 318 when determining and/or simulating the recommended aggregates 326. In some cases, certain instances of the rules 318 can be determined, in part, by the user 102. In other cases, the rules 318 can be dynamically managed by the rules learning module 308. Specifically, the data availed to the aggregate selector 122 (e.g., query history, performance statistics, etc.) can be used by the rules learning module 308 to modify the rules 318. For example, modifications to rule values, rule logic, rule application (e.g., when to apply a rule, the order of applying rules, etc.), and/or other rule attributes are possible.

When an aggregate has been selected, the aggregate selection logic 310 can further construct the aggregate logical plans (e.g., Aggregate1 logical plan $342_1$, ..., AggregateN logical plan $342_N$) associated with each selected aggregate for processing according to the herein disclosed techniques. In an exemplary embodiment, the aggregate logical plans can comprise a set of aggregate logical plan attributes 343 based in part on the virtual multidimensional data model 124. For example, the Aggregate1 logical plan $342_1$ refers to a "sum" type aggregate of the "qty" virtual cube attribute (e.g., a measure in the virtual cube). As another example, the AggregateN logical plan $342_N$ refers to a "distinct-count" type aggregate of the "custID" virtual cube attribute (e.g., a dimension in the virtual cube). In other cases, the aggregate logical plan attributes 343 might be based in part on information from the distributed data metastore 113. The aggregate logical plan attributes 343 can further comprise attributes associated with the query strategy and/or structure used to generate the aggregate.

The aggregate selection subsystem 3A00 presents merely one partitioning. The specific example shown where an aggregate selector 122 comprises a query monitor 302, an aggregate performance predictive model 304, an aggregate simulator 306, a rules learning module 308, and a set of aggregate selection logic 310, and is associated with certain data storage facilities and data models (e.g., query history 312, performance statistics 314, rules 318, virtual multidimensional data model 124, and distributed data metastore 113) is purely exemplary, and other partitioning is reasonable, and the partitioning may be defined in part by the volume of empirical data. Techniques for predicting and/or selecting aggregates to facilitate dynamic aggregate generation and updating for high performance querying of large datasets can be implemented in any of a wide variety of systems, subsystems, and/or partitionings. One such technique is shown and described as pertaining to FIG. 3B.

Figure 3B:
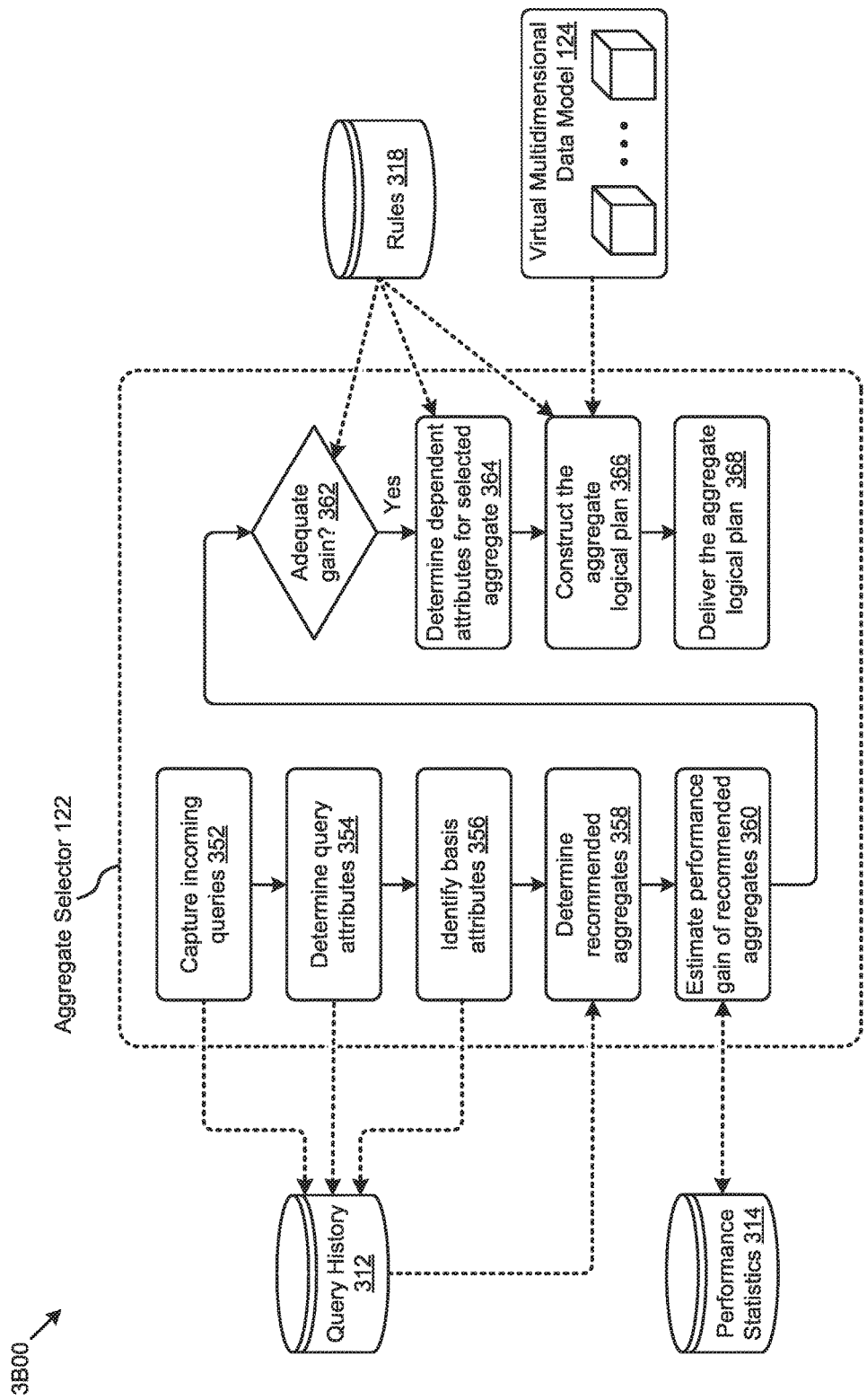
FIG. 3B depicts an aggregate selection technique used in systems implementing dynamic aggregate generation and updating for high performance querying of large datasets, according to some embodiments.

FIG. 3B depicts an aggregate selection technique 3B00 for selecting aggregates in systems implementing dynamic aggregate generation and updating for high performance querying of large datasets, according to an embodiment. As an option, one or more instances of aggregate selection technique 3B00 or any aspect thereof may be implemented in the context of the architecture and functionality of the embodiments described herein. Also, the aggregate selection technique 3B00 or any aspect thereof may be implemented in any desired environment.

The aggregate selection technique 3B00 presents one embodiment of certain steps for predicting and/or selecting aggregates to facilitate dynamic aggregate generation and updating for high performance querying of large datasets. In one or more embodiments, the steps and underlying operations comprising the aggregate selection technique 3B00 can be executed by the aggregate selector 122. Specifically, the aggregate selection technique 3B00 can commence with the aggregate selector 122 capturing incoming queries configured to operate on a subject database (see step 352). The incoming queries can be analyzed (e.g., parsed) to determine the various query attributes associated with the incoming queries (see step 354). Specifically, a set of basis attributes included in the query attributes can be identified (see step 356). Such basis attributes can characterize the dimensionality of the query and/or the dependencies of the query. In some cases, the foregoing attributes can be stored (e.g., in query history 312) for use throughout the aggregate selection technique 3B00.

Specifically, the query attributes stored in the query history 312 might be used to determine one or more recommended aggregates and/or views associated with one or more incoming queries (see step 358). The performance gain (e.g., as compared to the basis attributes of the incoming queries) of such recommended aggregates can be estimated (see step 360). Other performance metrics for categorizing the recommended aggregates are possible. In some cases, certain performance metrics and/or statistics (e.g., performance statistics 314) associated with, for example, certain historical and/or simulated aggregates, can be used to estimate the performance of the recommended aggregates. In other cases, the performance metric estimates of the recommended aggregates can be stored as instances of performance statistics 314 for use throughout the aggregate selection technique 3B00.

The estimated performance gain of a given recommended aggregate can then be tested for adequacy (see decision 362). For example, the performance gain might be compared to a threshold in the rules 318 to determine adequacy. If the estimated performance gain is adequate (see "Yes" path of decision 362), then the dependent attributes for the selected aggregate can be determined (see step 364). In some cases, the dependent attributes identified for including in the selected aggregate can be associated with one or more captured incoming queries. In other cases, when the number of dependent attributes is small (e.g., relative to a threshold in the rule 318), dependent attributes that have not been detected in incoming queries might be included in the selected aggregate. As shown, the detailed attribute relationships included in the virtual multidimensional data model 124 can facilitate determining the dependent attributes for the selected aggregate. For example, certain attributes can be included in the selected aggregate based in part on certain information (e.g., the attributes will not increase the aggregate row count) derived from the virtual multidimensional data model 124. The ability to reference the virtual multidimensional data model 124 in selecting aggregates is useful in HDFS frameworks in which certain key declarations that exist in relationship database systems are not available. The aggregate selector 122 can use the identified dependent attributes and/or other attributes (e.g., from the virtual multidimensional data model 124) to construct an aggregate logical plan for the selected aggregate (see step 366). The aggregate logical plan can be delivered and/or scheduled for delivery for use by systems implementing dynamic aggregate generation and updating for high performance querying of large datasets (see step 368). In some cases, a received incoming query can invoke the selection and generation of one or more aggregates that can be dynamically applied to the received incoming query at query time to improve the performance of the received incoming query.

The aggregates selected by the techniques facilitated by the aggregate selection subsystem 3A00 and/or the aggregate selection technique 3B00 can be generated according to the herein disclosed techniques for implementing dynamic aggregate generation and updating for high performance querying of large datasets. One such technique is discussed as pertains to FIG. 4A.

Figure 4A:
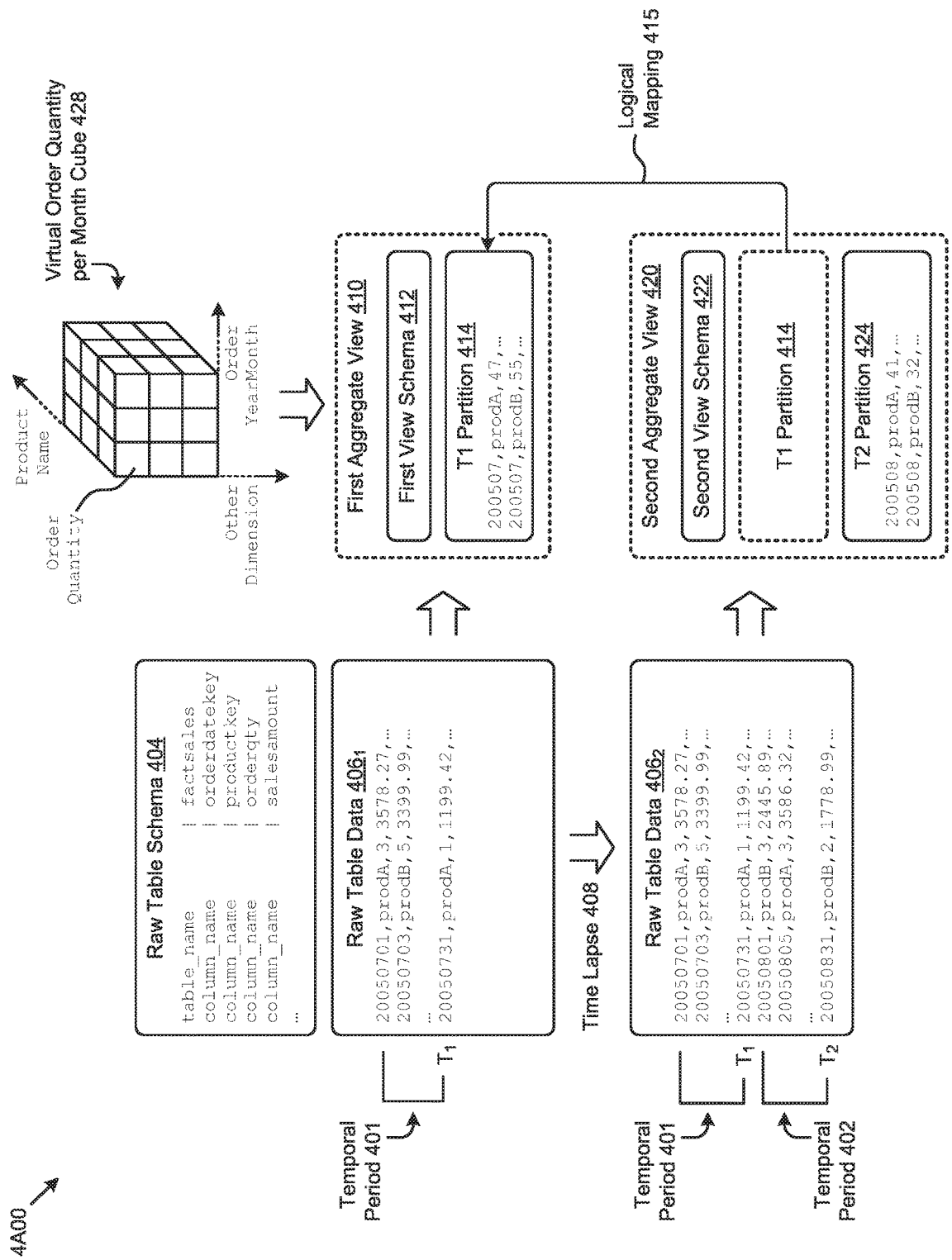
FIG. 4A depicts a time-based aggregation technique used in systems implementing dynamic aggregate generation and updating for high performance querying of large datasets, according to an embodiment.

FIG. 4A depicts a time-based aggregation technique 4A00 used in systems implementing dynamic aggregate generation and updating for high performance querying of large datasets, according to an embodiment. As an option, one or more instances of time-based aggregation technique 4A00 or any aspect thereof may be implemented in the context of the architecture and functionality of the embodiments described herein. Also, the time-based aggregation technique 4A00 or any aspect thereof may be implemented in any desired environment.

The time-based aggregation technique 4A00 illustrates the aggregation of an attribute (e.g., measure, dimension, etc.) of a virtual cube associated with certain underlying raw (e.g., not aggregated) physical data having a time-based attribute (e.g., a date and/or time dimension, column, and/or field). The time-based aggregation technique 4A00 further illustrates the generation and maintenance (e.g., updating) of the aggregate tables, views, and partitions associated with the aggregate, as can be used in systems implementing the herein disclosed techniques and approaches. Specifically, FIG. 4A shows a virtual order quantity per month cube 428 that can be part of a virtual multidimensional data model of an underlying subject database. The virtual order quantity per month cube 428 is defined by the dimensions "Product Name", "Order YearMonth", and "Other Dimension" (e.g., geographic region), with each cell holding an "Order Quantity" amount for a respective combination of dimension values (e.g., "widget A", "July 2005", and "North America", respectively). FIG. 4A further depicts an instance of the underlying physical data associated with the virtual order quantity per month cube 428 characterized by a raw table schema 404 defining a raw table named "fact sales" and two instances of the data in "fact sales" (e.g., raw table data $406_1$ and raw table data $406_2$), separated by a time lapse 408 (e.g., 1 month). Specifically, as shown in the raw table schema 404, the "factsales" table is structured to have an "orderdatekey" column, a "productkey" column, an "orderqty" column, and other columns. Further, as shown, the raw table data $406_1$ comprises rows of data (e.g., comma-delimited log entries) that span a temporal period 401 (e.g., July 2005), and the raw table data $406_2$ comprises rows of data that span the temporal period 401 (e.g., July 2005) and a temporal period 402 (e.g., August 2005).

For the example shown in the time-based aggregation technique 4A00, an aggregate (e.g., sum) of the measure "Order Quantity" over the dimensions "Product Name" and "Order YearMonth" is desired. According to the virtual cube attributes of the virtual order quantity per month cube 428, such an aggregate corresponds to the measure "orderqty" over the dimensions "productkey" and "orderdatekey", respectively, in the raw subject data. In this case, a first aggregate view 410 can be generated from the raw table data $406_1$ at time $T_1$ to comprise a first view schema 412 and a T1 partition 414. Specifically, the data comprising the T1 partition 414 includes the aggregate of the "orderqty" for each "productkey" during the temporal period 401 (e.g., "200507"). The T1 partition can be associated with a previously existing physical table or with a newly created physical table. The metadata comprising the first view schema 412 can include certain view attributes (e.g., location, table name, partition key, partition value, column names, data types, etc.) describing, in part, the T1 partition 414. After the time lapse 408, a second aggregate view 420 can be generated from the raw table data $406_2$ at time $T_2$ to comprise a second view schema 422, a logical mapping 415 to the T1 partition 414, and a T2 partition 424. Specifically, the data comprising the T2 partition 424 includes the aggregate of the "orderqty" for each "product key" during the temporal period 402 (e.g., "200508"). In the second aggregate view 420, the metadata comprising the second view schema 422 can included certain view attributes describing, in part, the T1 partition 414, the T2 partition 424, and the association (e.g., logical mapping 415) between the partitions. For example, when a query references the second aggregate view 420, the second view schema 422 is evaluated to produce one or more rows (e.g., an aggregate of the data in the T1 partition 414 and the data in the T2 partition 424) for further processing by the query. As such, the time-based aggregation technique 4A00 can efficiently create and maintain (e.g., update) various aggregate views (e.g., comprising multiple table partitions across multiple physical storage locations) to enable dynamic aggregate generation and updating for high performance querying of large datasets. In one or more embodiments, an aggregate can also be independent of any measure in the subject database (e.g., a "factless aggregate", a "measureless aggregate", etc.). For example, an aggregate can enumerate the possible values of a certain dimension (e.g., to populate a selection dropdown menu). As another example, an aggregate can comprise the possible combinations of two or more dimensions.

In the foregoing, aggregate views and/or partitions are based in part on temporal periods derived from a date and/or time dimension (e.g., "orderdatekey"). In other embodiments, the aggregate views and/or partitions can be based on other attribute types (e.g., incremental indicator, monotonically increasing identifier, etc.) as discussed in FIG. 4B.

Figure 4B:
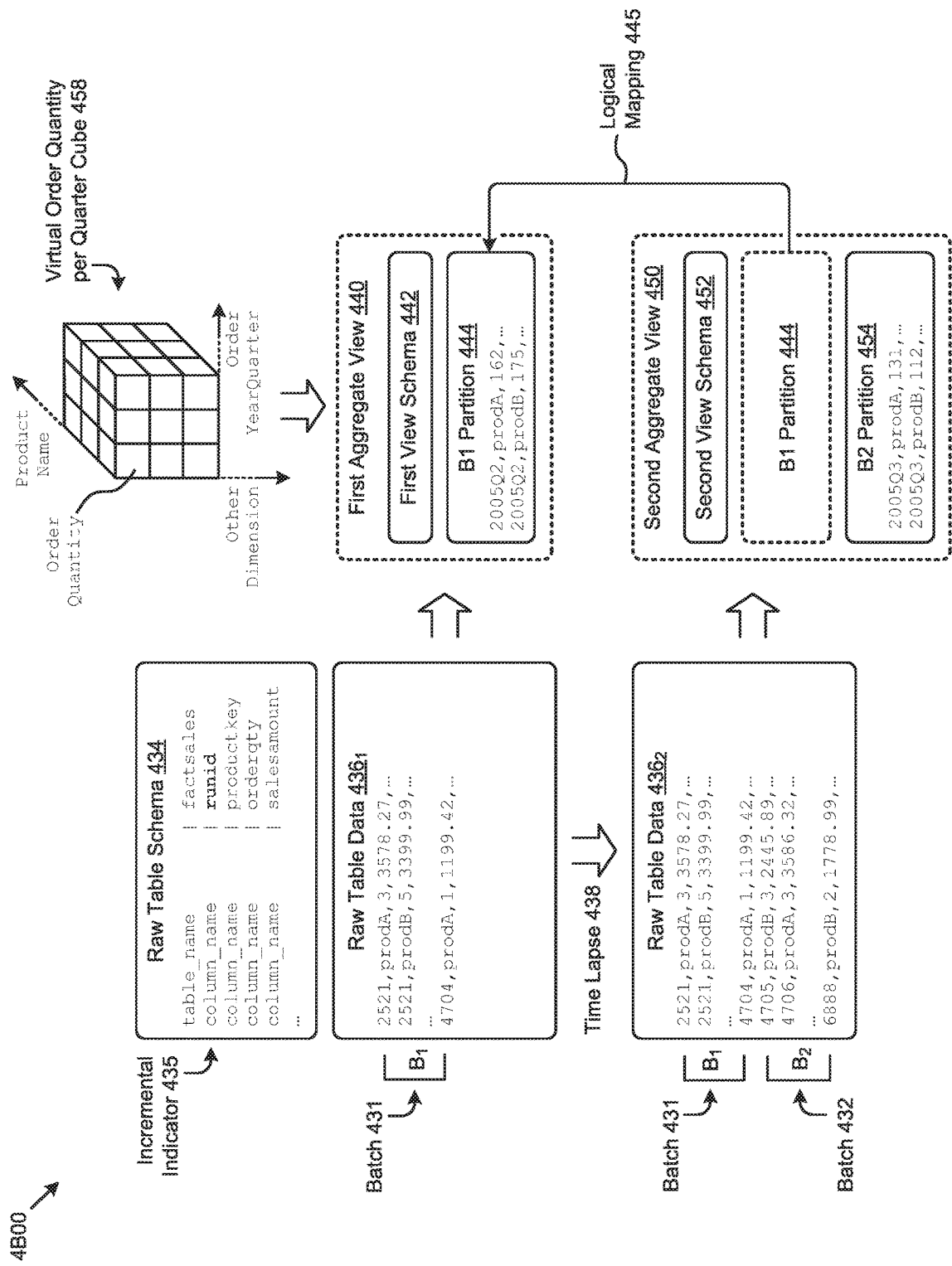
FIG. 4B depicts an indicator-based aggregation technique used in systems implementing dynamic aggregate generation and updating for high performance querying of large datasets, according to an embodiment.

FIG. 4B depicts an indicator-based aggregation technique 4B00 used in systems implementing dynamic aggregate generation and updating for high performance querying of large datasets, according to an embodiment. As an option, one or more instances of indicator-based aggregation technique 4B00 or any aspect thereof may be implemented in the context of the architecture and functionality of the embodiments described herein. Also, the indicator-based aggregation technique 4B00 or any aspect thereof may be implemented in any desired environment.

The indicator-based aggregation technique 4B00 illustrates the aggregation of an attribute (e.g., measure, dimension, etc.) of a virtual cube associated with certain underlying raw (e.g., not aggregated) physical data having a non-time-based attribute (e.g., incremental indicator, monotonically increasing identifier, etc.) used to detect an order of the raw data. The indicator-based aggregation technique 4B00 further illustrates the generation and maintenance (e.g., updating) of the aggregate tables, views, and partitions associated with the aggregate, as can be used in systems implementing the herein disclosed techniques and approaches. Specifically, FIG. 4B shows a virtual order quantity per quarter cube 458 that can be part of a virtual multidimensional data model of an underlying subject database. The virtual order quantity per quarter cube 458 is defined by the dimensions "Product Name", "Order Year-Quarter", and "Other Dimension" (e.g., geographic region), with each cell holding a "Order Quantity" amount for a respective combination of dimension values (e.g., "Widget A", "2005 Q2", and "North America", respectively). FIG. 4B further depicts an instance of the underlying physical data associated with the virtual order quantity per quarter cube 458 characterized by a raw table schema 434 defining a raw table named "fact sales" and two instances of the data in "fact sales" (e.g., raw table data $436_1$ and raw table data $436_2$), separated by a time lapse 438 (e.g., 1 quarter). Specifically, as shown in the raw table schema 434, the "factsales" table is structured to have a "runid" column, a "product key" column, an "orderqty" column, and other columns. In this case, with no time reference in the raw table schema 434, the "runid" value can serve as an incremental indicator 435. Further, as shown, the raw table data $436_1$ comprises rows of data (e.g., comma-delimited log entries) that span a batch 431 (e.g., runid=2521-4704), and the raw table data $436_2$ comprises rows of data that span the batch 431 (e.g., runid=2521-4704) and a batch 432 (e.g., runid=4705-6888). For example, the data owner might be importing to the subject database hourly sales data runs having increasing unique identifiers (e.g., runid) such that a batch of run identifiers (e.g., 2184 sequential runids) can comprise a set of quarterly data.

For the example shown in the indicator-based aggregation technique 4B00, an aggregate (e.g., sum) of the measure "Order Quantity" over the dimensions "Product Name" and "Order YearQuarter" is desired. According to the virtual cube attributes of the virtual order quantity per quarter cube 458, such an aggregate corresponds to the measure "orderqty" over the dimension "productkey", respectively, in the raw subject data. Yet, with no time-based attribute (e.g., column) in the raw data, the time dimension is not explicit in the data and/or schema. The herein disclosed techniques can address issues pertaining to raw data having no time-based attribute by detecting and processing available incremental indicators in the raw data. Such incremental indicators might include run identifiers, job identifiers, session identifiers, and/or other indicators. In some cases, the relationships between virtual cube dimensions and incremental indicators can be included in the virtual cube attributes of the virtual multidimensional data model. In other cases, the relationships between virtual cube dimensions and incremental indicators can be specified by a user. In such cases, a first aggregate view 440 can be generated from the batch 431 of the raw table data $436_1$ to comprise a first view schema 442 and a B1 partition 444. Specifically, the data comprising the B1 partition 444 includes the aggregate of the "orderqty" for each "productkey" for the batch 431 of runids mapped to the quarter "2005Q2" (e.g., as specified by the virtual cube attributes, by the user, etc.). The B1 partition can be associated with a previously existing physical table or with a newly created physical table. The metadata comprising the first view schema 442 can include certain view attributes (e.g., location, table name, partition key, partition value, column names, data types, etc.) describing, in part, the B1 partition 444. After the time lapse 438, a second aggregate view 450 can be generated from the batch 432 of the raw table data $436_2$ to comprise a second view schema 452, a logical mapping 445 to the B1 partition 444, and a B2 partition 454. Specifically, the data comprising the B2 partition 454 includes the aggregate of the "orderqty" for each "product key" for the batch 432 of runids mapped to the quarter "2005Q3" (e.g., as specified by the virtual cube attributes, by the user, etc.). In the second aggregate view 450, the metadata comprising the second view schema 452 can include certain view attributes describing, in part, the B1 partition 444, the B2 partition 454, and the association (e.g., logical mapping 445) between the partitions. For example, when a query references the second aggregate view 450, the second view schema 452 is evaluated to produce one or more rows (e.g., an aggregate of the data in the B1 partition 444 and the data in the B2 partition 454) for further processing by the query. As such, the indicator-based aggregation technique 4B00 can efficiently create and maintain (e.g., update) various aggregate views (e.g., comprising multiple table partitions across multiple physical storage locations) to enable dynamic aggregate generation and updating for high performance querying of large datasets.

Figure 4C:
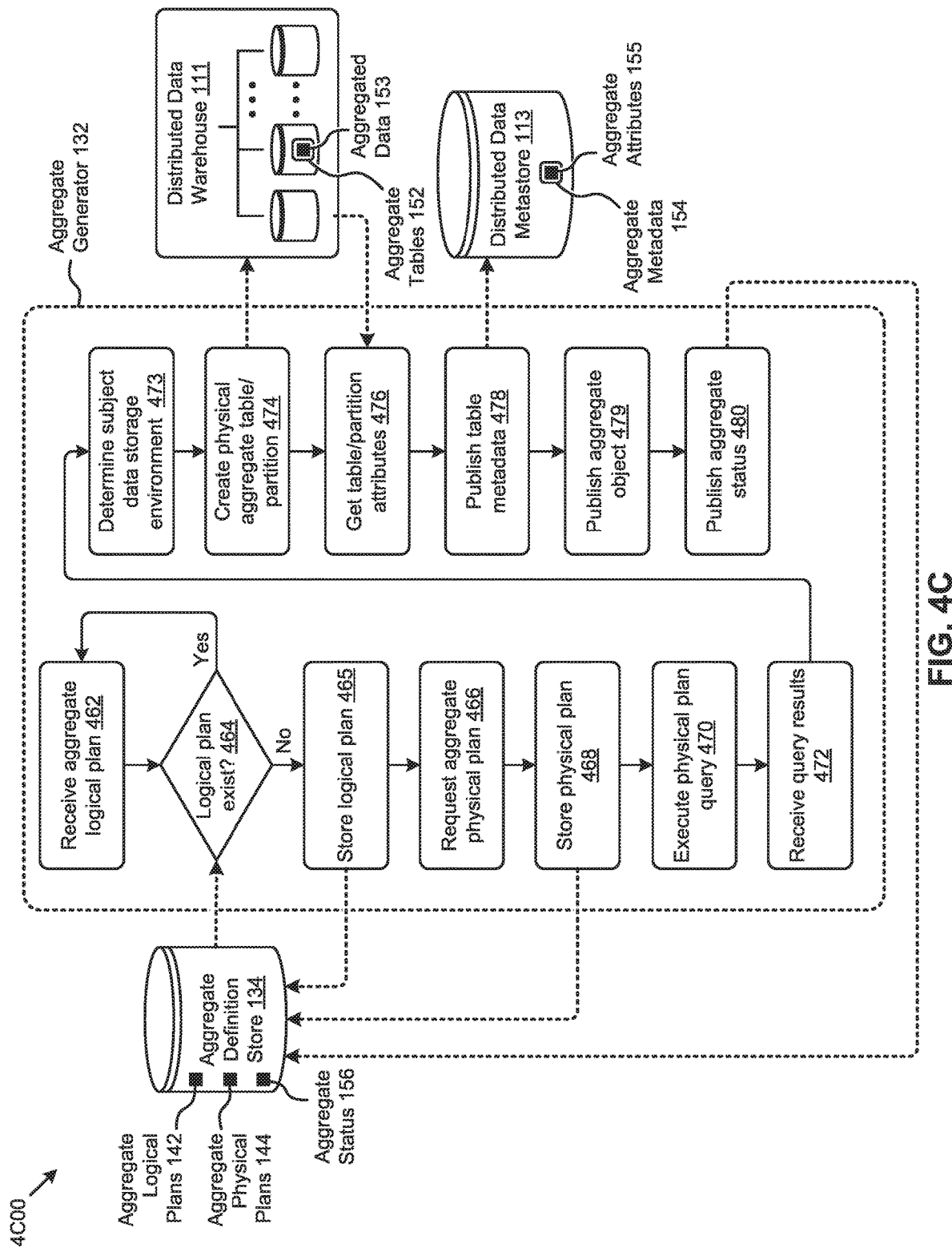
FIG. 4C presents an aggregate generation technique used in systems implementing dynamic aggregate generation and updating for high performance querying of large datasets, according to an embodiment.

Further details describing the herein disclosed techniques for generating the foregoing aggregate tables, partitions, schema, metadata, and/or other related information are discussed in FIG. 4C.

FIG. 4C presents an aggregate generation technique 4C00 used in systems implementing dynamic aggregate generation and updating for high performance querying of large datasets, according to an embodiment. As an option, one or more instances of aggregate generation technique 4C00 or any aspect thereof may be implemented in the context of the architecture and functionality of the embodiments described herein. Also, the aggregate generation technique 4C00 or any aspect thereof may be implemented in any desired environment.

The aggregate generation technique 4C00 presents one embodiment of certain steps for generating aggregate tables, partitions, schema, metadata, and/or other related information in systems implementing dynamic aggregate generation and updating for high performance querying of large datasets. In one or more embodiments, the steps and underlying operations comprising the aggregate generation technique 4C00 can be executed by the aggregate generator 132 in block diagram 1B00. The distributed data warehouse 111, the distributed data metastore 113, and the aggregate definition store 134 from block diagram 1B00 are also shown for reference. Specifically, the aggregate generation technique 4C00 can commence with the aggregate generator 132 receiving an aggregate logical plan for generating a selected aggregate defined in the plan (see step 462). For example, the aggregate logical plan can be received in response to an aggregate selector identifying an aggregate based on historical queries, predictions that the aggregate can improve query performance, user specification, and other factors. The aggregate generator 132 can then check whether the received aggregate logical plan exists in the aggregate logical plans 142 in the aggregate definition store 134 (see decision 464). In some embodiments, when the received aggregate logical plans exists (see "Yes" path of decision 464), the aggregate tables, partitions, and/or metadata associated with the received aggregate logical plan can be earlier generated, and the aggregate generation technique 4C00 can respond accordingly (e.g., reject aggregate request as invalid and/or redundant, wait for next aggregate logical plan, etc.). When the received aggregate logical plan does not exist (see "No" path of decision 464), the aggregate generator 132 can then store the aggregate logical plan in the aggregate logical plans 142 in the aggregate definition store 134 (see step 465). The aggregate generator 132 can further request that an aggregate physical plan associated with the received aggregate logical plan be generated (see step 466). The generated aggregate physical plan can then be stored in the aggregate physical plans 144 in the aggregate definitions store 134 (see step 468). The aggregate physical plan can further be executed (see step 470). As an example, the generated aggregate physical plan can be an aggregate database statement comprising certain subject database statements conforming to a query language that can be executed by a distributed data query engine on a subject database to return an aggregate result set to be received by the aggregate generator 132 (see step 472). The aggregate generator 132 can then determine the subject data storage environment for the generated aggregate tables, partitions, and/or metadata (see step 473). For example, certain aggregate table storage formats (e.g., Apache Parquet) may perform better in some environments as compared to other environments. When the subject environment and associated formats and other attributes have been determined, one or more physical aggregate tables and/or partitions can be created (see step 474). For example, as shown, the aggregate generator 132 can create at least a portion of the aggregate tables 152 (e.g., including partitions) in the distribute data warehouse 111 (e.g., a Hive table in HDFS). In some cases, the aggregate tables 152 can be created by certain commands included in the subject database statements developed for the aggregate. When the aggregate tables and/or partitions have been created, the aggregate generator 132 can get various aggregate attributes (e.g., validation of creation, size, structure, etc.) pertaining to the created aggregate tables and/or partitions (see step 476) to publish as aggregate metadata 154 (see step 478). For example, as shown, the aggregate generator 132 can create and/or update at least a portion of the aggregate metadata 154 stored in the distributed data metastore 113 (e.g., Hive metastore). In some embodiments, a serialized aggregate object (e.g., JSON string) representing the aggregate can be published (see step 479). For example, the aggregate object can be published to a query planner and stored in a local cache to be used in generating subject database statements that exhibit high performance. Various attributes pertaining to the status of the generated aggregate tables, partitions, and/or metadata can be stored in the aggregate status 156 area of the aggregate definition store 134 (see step 480).

Such aggregate status information and/or other information might be used to maintain certain aggregates according to the herein disclosed techniques. One such technique is described in FIG. 5.

Figure 5:
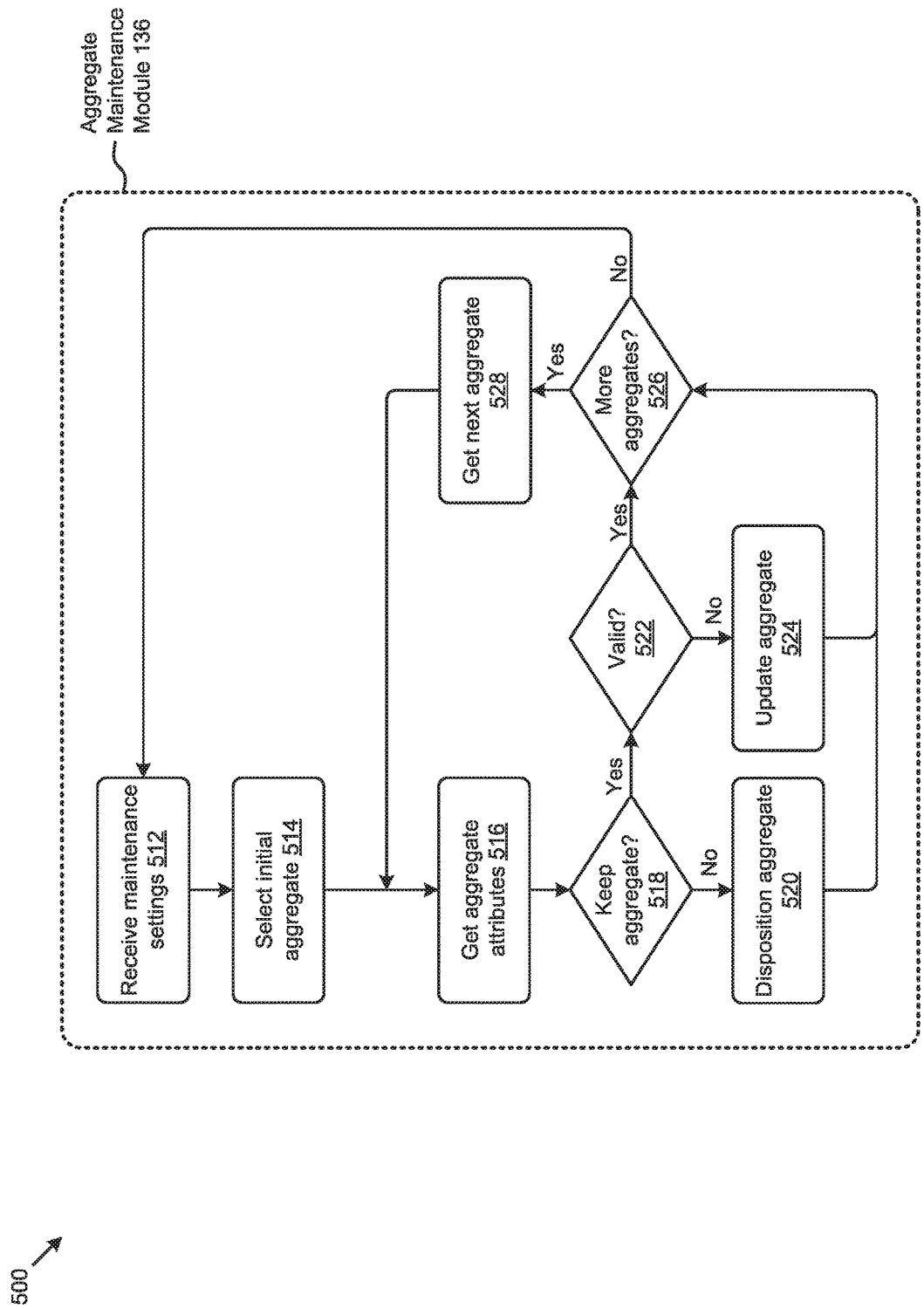
FIG. 5 illustrates an aggregate maintenance technique used in systems implementing dynamic aggregate generation and updating for high performance querying of large datasets, according to an embodiment.

FIG. 5 illustrates an aggregate maintenance technique 500 used in systems implementing dynamic aggregate generation and updating for high performance querying of large datasets, according to an embodiment. As an option, one or more instances of aggregate maintenance technique 500 or any aspect thereof may be implemented in the context of the architecture and functionality of the embodiments described herein. Also, the aggregate maintenance technique 500 or any aspect thereof may be implemented in any desired environment.

The aggregate maintenance technique 500 presents one embodiment of certain steps for maintaining aggregates in systems implementing dynamic aggregate generation and updating for high performance querying of large datasets. In one or more embodiments, the steps and underlying operations comprising the aggregate maintenance technique 500 can be executed by the aggregate maintenance module 136 in block diagram 1B00. Specifically, aggregate maintenance technique 500 can commence with the aggregate maintenance module 136 receiving certain maintenance settings (e.g., maintenance schedule, aggregate usage thresholds, etc.) from various sources, such as a user (see step 512). In one or more embodiments, an initial aggregate to evaluate can be selected (see step 514) and the aggregate maintenance technique 500 can continue to certain steps that can be executed for the initial selected aggregate, and for each aggregate available for maintenance operations. Specifically, the aggregate maintenance module 136 can get various attributes (e.g., status, usage, etc.) of the selected aggregate (see step 516) to determine if the aggregate should be kept for continued use (see decision 518). For example, certain aggregates might be removed based at least in part on historical usage to manage the computing and/or storage resources required to keep the aggregates. If the aggregate should not be kept (see "No" path of decision 518), the aggregate can be dispositioned (see step 520). For example, dispositioning can include deactivating the aggregate, removing the physical aggregate tables and metadata, and/or other dispositioning operations. If the aggregate should be kept (see "Yes" path of decision 518), an aggregate validation can be invoked (see decision 522), which can include testing the existence of physical tables associated with the aggregate, the validity of tables and/or partitions underlying an aggregate view, the validity of the aggregate logical plan and/or aggregate physical plan associated with an aggregate, and/or other aggregate validation factors. In some cases, if the aggregate is not valid (see "No" path of decision 522), the aggregate can be updated (see step 524). For example, a physical table associated with an aggregate may have been moved and the aggregate metadata can be updated to reflect the move. When the selected aggregate has been dispositioned, updated, and/or validated, the aggregate maintenance technique 500 can check for additional aggregates to process (see decision 526), and select the next aggregate (see step 528) for the aforementioned maintenance operations. When all available aggregates have been processed (see "No" path of decision 526), the aggregate maintenance technique 500 can listen for further instructions and/or signal to invoke one or more of the foregoing operations. In some embodiments and/or for some maintenance settings, the aggregate maintenance technique 500 can continually loop or periodically loop (e.g., once per hour) through the available aggregates.

One aspect of maintaining an aggregate pertains to data being continually appended to a given subject database, raising challenges related to aggregate quality (e.g., "freshness", accuracy, etc.). For example, a website might populate a subject database with log entries recording each visit to the website. The log entries might comprise an incremental indicator (e.g., session identifier) and a unique identifier for the visitor. In some cases, such log entries can be captured from a single server and added to the database in a sequential order, facilitating a one-time generation of an aggregate (e.g., distinct count of unique visitors) for a given time period. In other cases, log entries might be added to the subject database from multiple servers such that some log entries might be out of sequence at least as pertains to the incremental indicator value. In such cases, one or more instances of out-of-order data might not be included in the appropriate aggregate, resulting in diminished aggregate accuracy. One embodiment of a technique to address such challenges is described in FIG. 6A.

Figure 6A:
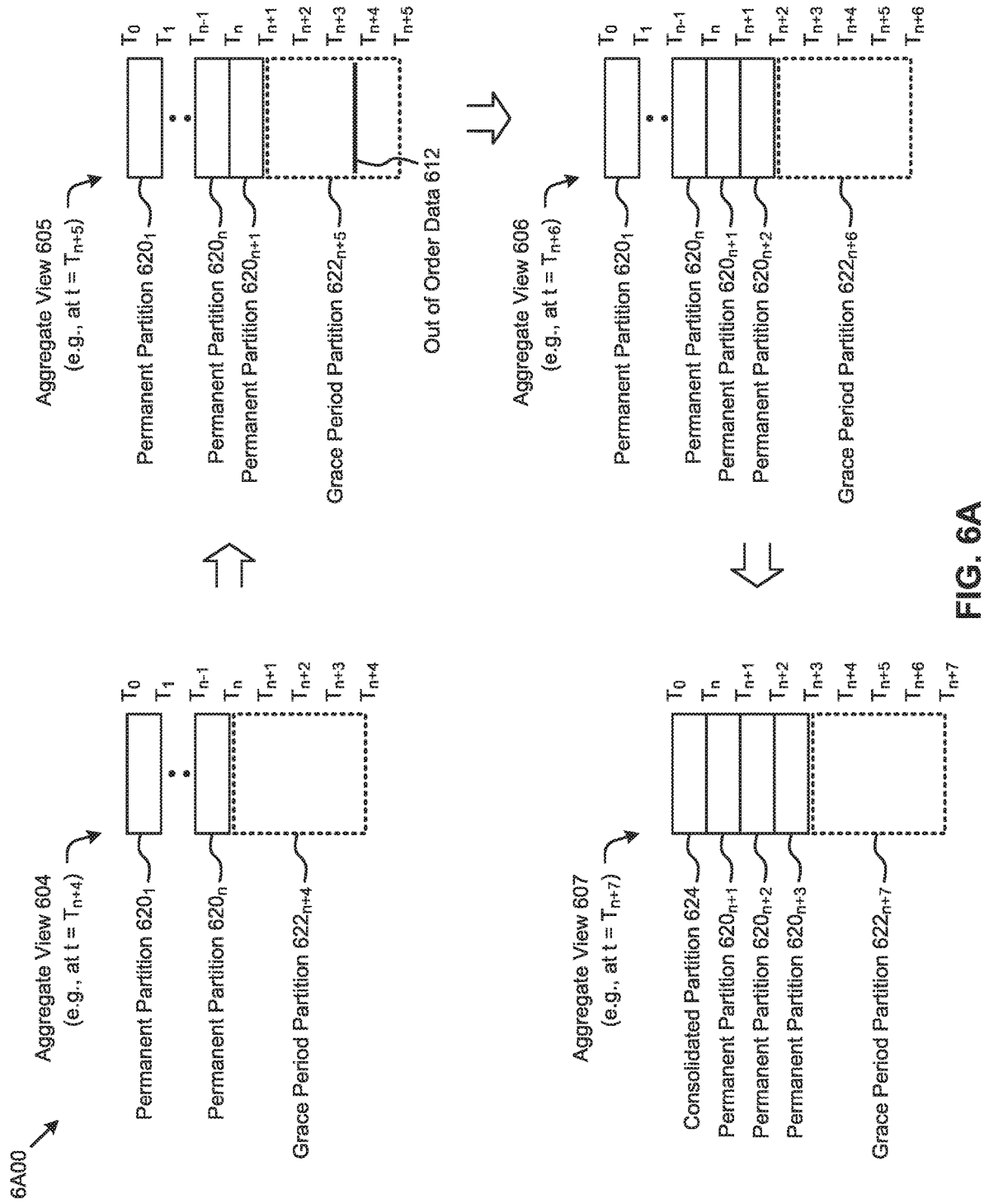
FIG. 6A depicts a grace period partitioning technique used in systems implementing dynamic aggregate generation and updating for high performance querying of large datasets, according to an embodiment.

FIG. 6A depicts a grace period partitioning technique 6A00 used in systems implementing dynamic aggregate generation and updating for high performance querying of large datasets, according to an embodiment. As an option, one or more instances of grace period partitioning technique 6A00 or any aspect thereof may be implemented in the context of the architecture and functionality of the embodiments described herein. Also, the grace period partitioning technique 6A00 or any aspect thereof may be implemented in any desired environment.

In one or more embodiments, the grace period partitioning technique 6A00 shown in FIG. 6A can at least in part enable dynamic aggregate generation and updating for high performance querying of large datasets. Specifically, the grace period partitioning technique 6A00 uses table partitioning and aggregate views to efficiently update aggregates, and resample aggregates over a specified time window (e.g., "grace period"), to improve aggregate quality, such as pertaining to data freshness, data accuracy, and other quality attributes. In some cases, the grace period partitioning technique 6A00 can be applied to data having a non-time-based incremental indicator. In such cases, the views, partitions, and/or grace periods can be bounded by certain incremental indicator values (e.g., as compared to timestamps).

As shown in FIG. 6A, the grace period partitioning technique 6A00 comprises four aggregate views, aggregate view 604, aggregate view 605, aggregate view 606, and aggregate view 607, generated (e.g., by the herein disclosed techniques) in sequence at progressively later times, $T_{n+4}$, $T_{n+5}$, $T_{n+6}$, and $T_{n+7}$, respectively. In the embodiment and example shown, the aggregate views are associated with a common aggregate (e.g., the sum of measure A for each dimension B) derived from a virtual multidimensional data model and/or a raw database table. Each aggregate view comprises partitions storing the aggregated data for a respective temporal period of stored raw data. More specifically, the aggregate view 604 comprises a permanent partition $620_1$ storing the aggregated data from time $T_0$ to $T_1$ (e.g., 15 minutes), to a permanent partition $620_1$ storing the aggregated data from time $T_{n-1}$ to $T_n$ (e.g., 15 minutes), and a grace period partition $622_{n+4}$ storing the aggregated data from time $T_n$ to $T_{n+4}$ (e.g., 60 minutes). In the case shown in FIG. 6A, the data collected in the raw database table over the temporal period from $T_n$ to $T_{n+4}$ will be aggregated and stored in the grace period partition $622_{n+4}$ at time $T_{n+4}$, yet the data collected prior to time $T_n$ will remain as earlier aggregated in permanent partition $620_1$ to permanent partition $620_n$. Such permanent partitions comprise immutable data, yet such grace period partitions comprise mutable data.

To capture any out-of-order data (e.g., from one or more slow remote web servers in a distributed storage network), such as out-of-order data 612, that is associated with a time prior to time $T_{n+4}$ yet inserted into the raw database table after the aggregate view 604 was created at time $T_{n+4}$, the aggregate view 605 can resample the data from time $T_{n+1}$ to $T_{n+4}$, and sample the most recent data from time $T_{n+4}$ to $T_{n+5}$, to produce the aggregated data to be stored in a grace period partition $622_{n+5}$. Since the raw data from time $T_n$ to $T_{n+1}$ is outside the grace period at time $T_{n+5}$, that portion of raw data will be sampled to produce the aggregated data for a permanent partition $620_{n+1}$. The aforementioned process can continue over time to produce new aggregate views (e.g., aggregate view 606 and aggregate view 607) having new grace period partitions (e.g., grace period partition $622_{n+6}$ and grace period partition $622_{n+7}$) and new permanent partitions (e.g., permanent partition $620_{n+2}$ and permanent partition $620_{n+3}$).

In some embodiments, certain permanent partitions can be consolidated into one or more consolidated partitions to further improve query performance (e.g., by reducing fragmentation inefficiencies over the distributed data warehouse 111). For example, aggregate view 607 shows a consolidated partition 624 created at time $T_{n+7}$ comprising a consolidated aggregate of the aggregated data associated with the permanent partitions spanning from the permanent partition $620_1$ to the permanent partition $620_n$. In other embodiments, the most recently created aggregate view is available (e.g., activated), and earlier created aggregate views are removed (e.g., view description metadata deleted) when there are no outstanding queries referencing the views. A process flow for implementing the grace period partitioning technique 6A00 is described as pertains to FIG. 6B.

Figure 6B:
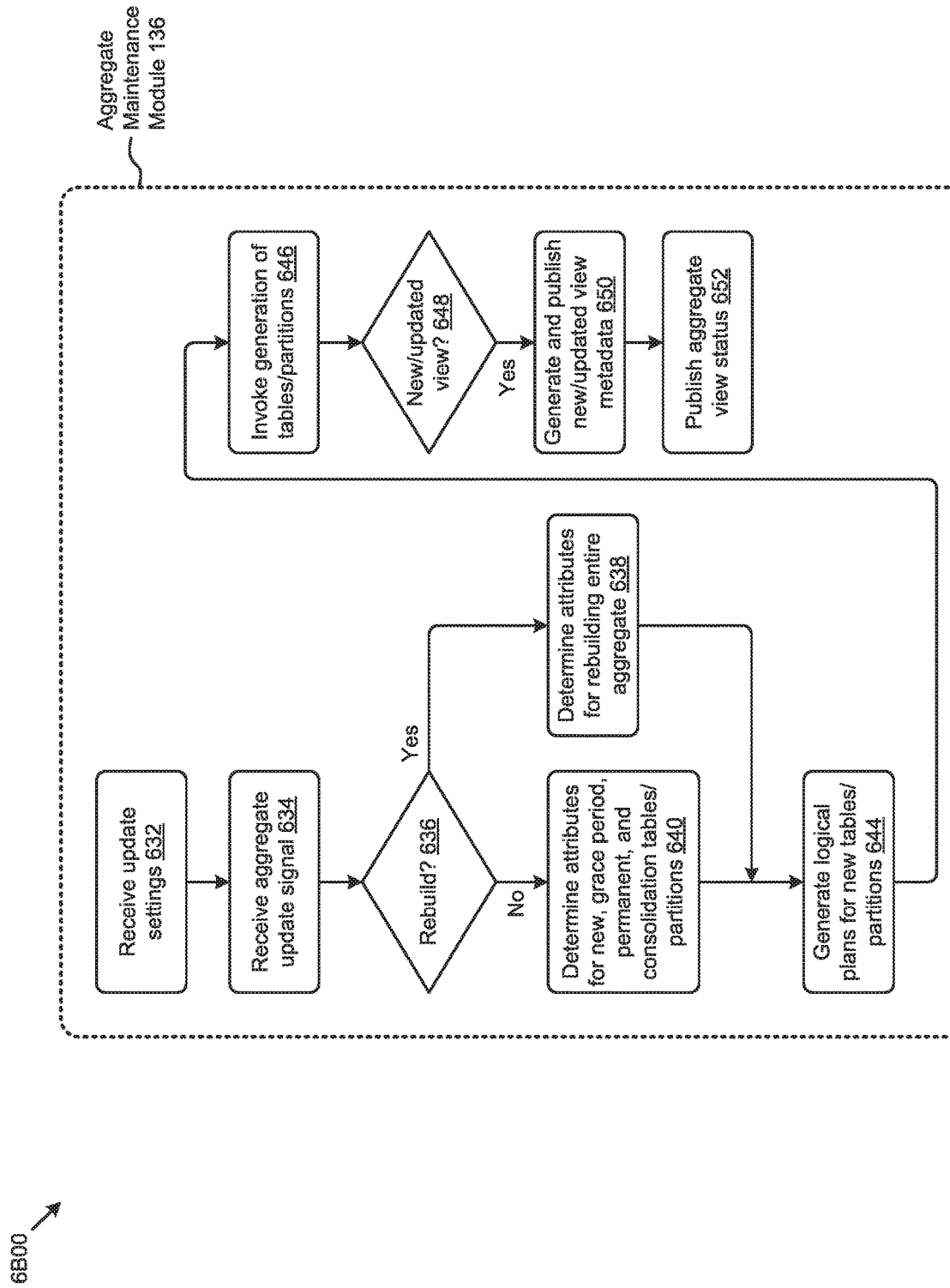
FIG. 6B presents an aggregate update technique used in systems implementing dynamic aggregate generation and updating for high performance querying of large datasets, according to an embodiment.

FIG. 6B presents an aggregate update technique 6B00 for updating aggregate tables in systems implementing dynamic aggregate generation and updating for high performance querying of large datasets, according to an embodiment. As an option, one or more instances of aggregate update technique 6B00 or any aspect thereof may be implemented in the context of the architecture and functionality of the embodiments described herein. Also, the aggregate update technique 6B00 or any aspect thereof may be implemented in any desired environment.

The aggregate update technique 6B00 presents one embodiment of certain steps for updating aggregate views, tables, partitions, and/or metadata in systems implementing dynamic aggregate generation and updating for high performance querying of large datasets. In one or more embodiments, the steps and underlying operations comprising the aggregate update technique 6B00 can be executed by the aggregate maintenance module 136 in block diagram 1B00. Specifically, the aggregate update technique 6B00 can commence with the aggregate maintenance module 136 receiving certain update settings (e.g., update frequency, grace period definition, etc.) from various sources, such as a user (see step 632). An aggregate update signal to invoke an update of a certain subject aggregate can then be received (see step 634). For example, the update signal can be from a scheduling operation, a manual user event, an aggregate age check, an incremental indicator change, and/or other sources and/or events. When the update signal is received, a determination can be made as to whether an incremental update or rebuild can be executed for the subject aggregate (see decision 636). For example, a "sum" aggregate is additive such that aggregates of new data can be combined with earlier generated aggregates in an incremental update, yet a "distinct count" aggregate is not additive, requiring a rebuild of the aggregate to capture any new data. As another example, a change in the incremental indicator of the aggregate can require a rebuild. In some cases, aggregates based on virtual multidimensional data models can require fewer rebuilds since certain changes to the underlying physical data and/or data structure that might otherwise invoke a rebuild can be captured in the virtual cube attributes of the virtual multidimensional data model.

If a rebuild of the subject aggregate is required (see "Yes" path of decision 636), the aggregate maintenance module 136 can perform a rebuild of the subject aggregate from the full raw dataset based on certain attributes determined for the rebuild (see step 638). If the subject aggregate can be incrementally updated (see "No" path of decision 636), then certain attributes describing any new, grace period, permanent, and/or consolidation tables and/or partitions associated with an incremental update can be determined (see step 640). The attributes describing the aggregate rebuild or incremental update can then be used to generate one or more aggregate logical plans corresponding to the subject aggregate update (see step 644). In some cases, the aggregate logical plans can be based in part on existing aggregate logical plans associated with a prior update of the subject aggregate. The aggregate maintenance module 136 can then invoke the generation of the tables and/or partitions (e.g., see aggregate generation technique 4C00) specified by the aggregate logical plans (see step 646). For example, according to aggregate generation technique 4C00, step 646 can generate various physical tables and/or partitions, table metadata, and/or aggregate statuses associated with the update. In some cases, the update does not generate or update an aggregate view (see decision 648). In other cases, the update generates or updates an aggregate view (see "Yes" path of decision 648) and the metadata associated with the aggregate view can be generated and published (see step 650). Further, status attributes associated with the aggregate view can be published (see step 652).

Additional Embodiments of the Disclosure

Additional Practical Application Examples

Figure 7A:
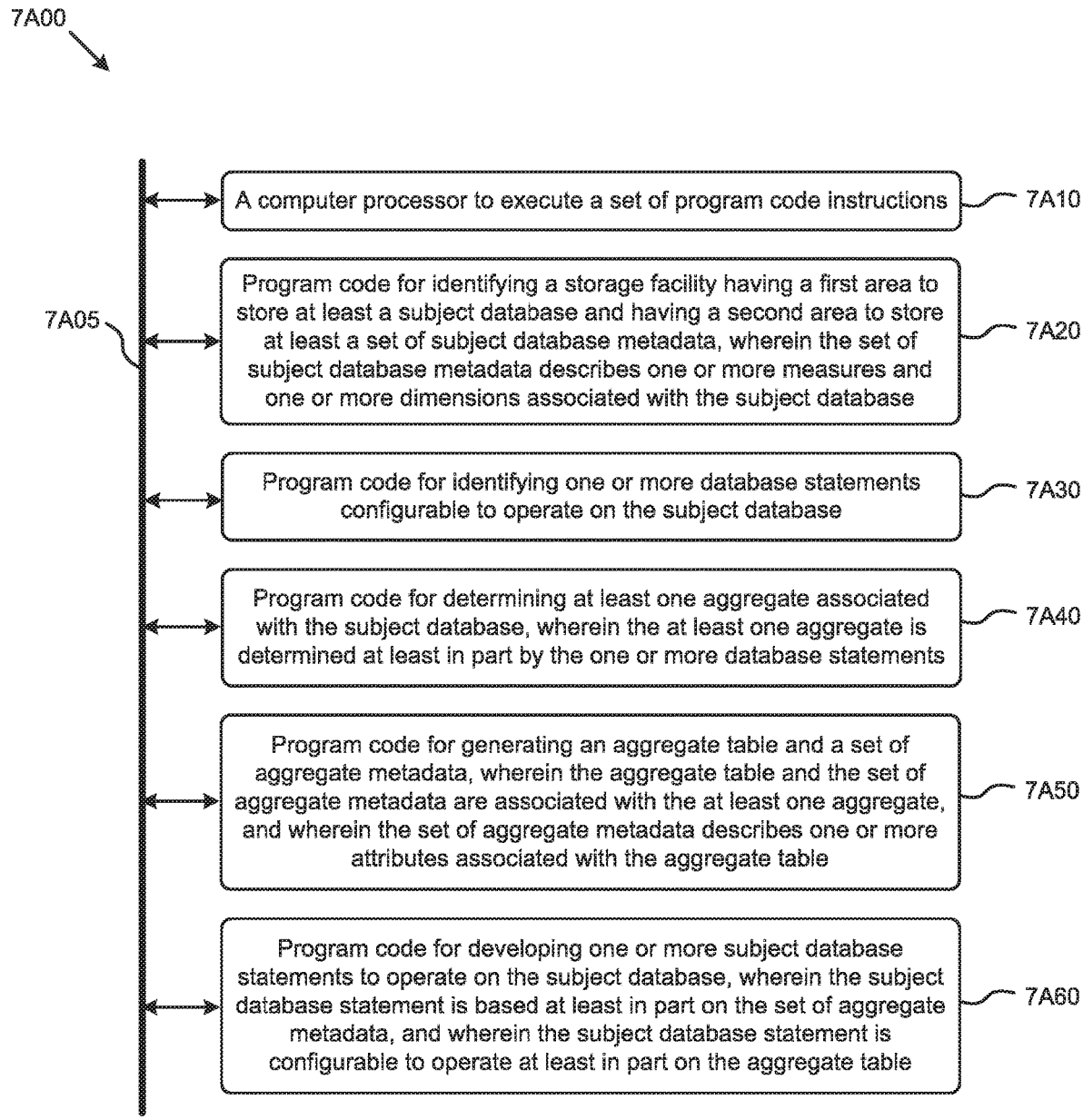
FIG. 7A, FIG. 7B, and FIG. 7C depict systems as an arrangement of computing modules that are interconnected so as to operate cooperatively to implement any of the herein-disclosed embodiments.

FIG. 7A depicts a block diagram of a system to perform certain functions of a computer system. As an option, the present system 7A00 may be implemented in the context of the architecture and functionality of the embodiments described herein. Of course, however, the system 7A00 or any operation therein may be carried out in any desired environment. The system 7A00 comprises at least one processor and at least one memory, the memory serving to store program instructions corresponding to the operations of the system. As shown, an operation can be implemented in whole or in part using program instructions accessible by a module. The modules are connected to a communication path 7A05, and any operation can communicate with other operations over communication path 7A05. The modules of the system can, individually or in combination, perform method operations within system 7A00. Any operations performed within system 7A00 may be performed in any order unless as may be specified in the claims. The shown embodiment in FIG. 7A implements a portion of a computer system, shown as system 7A00, comprising a computer processor to execute certain program code instructions (see module 7A10) and modules for accessing memory to hold program code instructions to perform: identifying a storage facility having a first area to store at least a subject database and having a second area to store at least a set of subject database metadata, wherein the set of subject database metadata describes one or more measures and one or more dimensions associated with the subject database (see module 7A20); identifying one or more database statements configurable to operate on the subject database (see module 7A30); determining at least one aggregate associated with the subject database, wherein the at least one aggregate is determined at least in part by the one or more database statements (see module 7A40); generating an aggregate table and a set of aggregate metadata, wherein the aggregate table and the set of aggregate metadata are associated with the at least one aggregate, and wherein the set of aggregate metadata describes one or more attributes associated with the aggregate table (see module 7A50); and developing one or more subject database statements to operate on the subject database, wherein the subject database statement is based at least in part on the set of aggregate metadata, and wherein the subject database statement is configurable to operate at least in part on the aggregate table (see module 7A60).

Figure 7B:
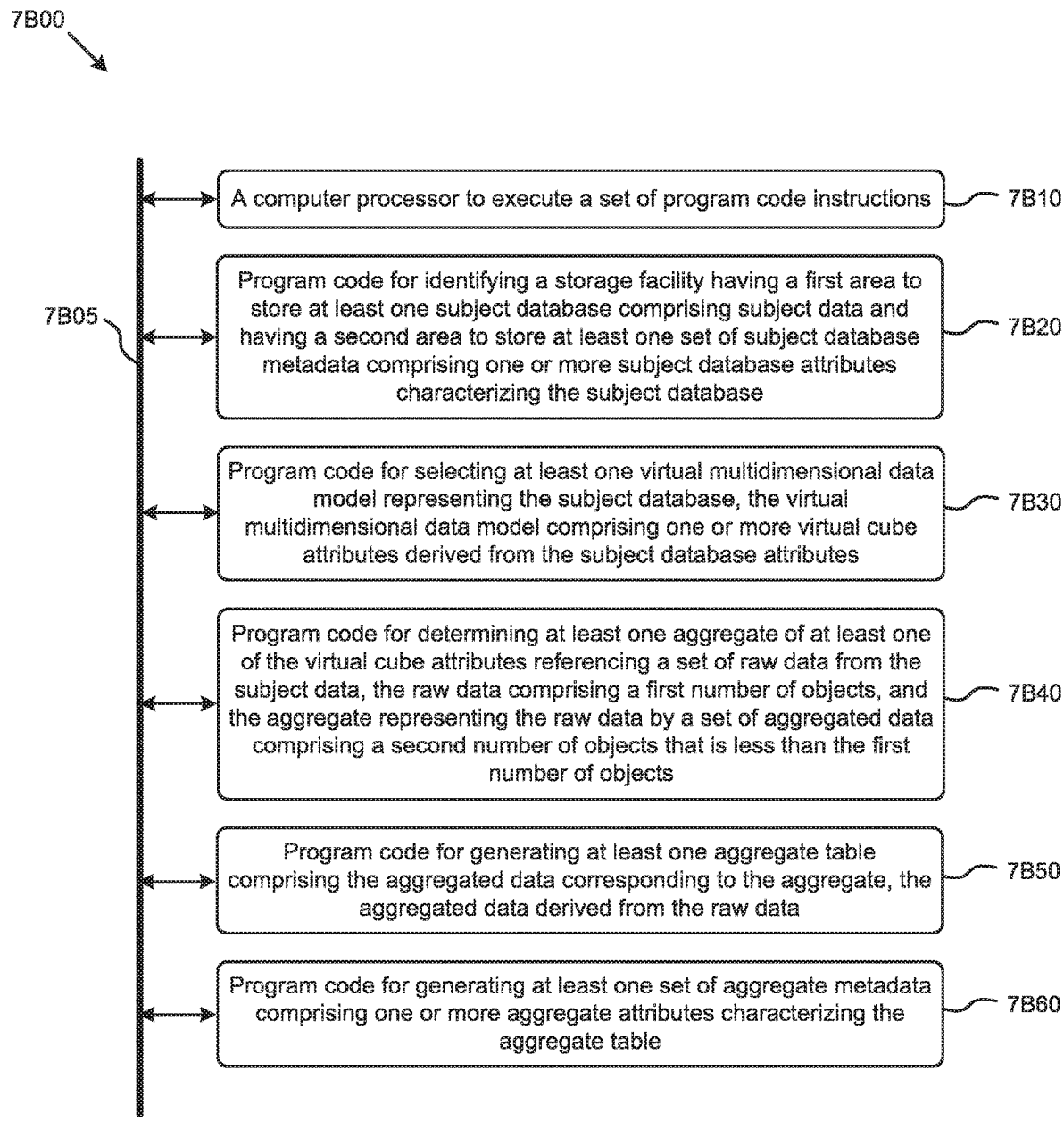

FIG. 7B depicts a block diagram of a system to perform certain functions of a computer system. As an option, the present system 7B00 may be implemented in the context of the architecture and functionality of the embodiments described herein. Of course, however, the system 7B00 or any operation therein may be carried out in any desired environment. The system 7B00 comprises at least one processor and at least one memory, the memory serving to store program instructions corresponding to the operations of the system. As shown, an operation can be implemented in whole or in part using program instructions accessible by a module. The modules are connected to a communication path 7B05, and any operation can communicate with other operations over communication path 7B05. The modules of the system can, individually or in combination, perform method operations within system 7B00. Any operations performed within system 7B00 may be performed in any order unless as may be specified in the claims. The shown embodiment in FIG. 7B implements a portion of a computer system, shown as system 7B00, comprising a computer processor to execute certain program code instructions (see module 7B10) and modules for accessing memory to hold program code instructions to perform: identifying a storage facility having a first area to store at least one subject database comprising subject data and having a second area to store at least one set of subject database metadata comprising one or more subject database attributes characterizing the subject database (see module 7B20); selecting at least one virtual multidimensional data model representing the subject database, the virtual multidimensional data model comprising one or more virtual cube attributes derived from the subject database attributes (see module 7B30); determining at least one aggregate of at least one of the virtual cube attributes referencing a set of raw data from the subject data, the raw data comprising a first number of objects, and the aggregate representing the raw data by a set of aggregated data comprising a second number of objects that is less than the first number of objects (see module 7B40); generating at least one aggregate table comprising the aggregated data corresponding to the aggregate, the aggregated data derived from the raw data (see module 7B50); and generating at least one set of aggregate metadata comprising one or more aggregate attributes characterizing the aggregate table (see module 7B60).

Figure 7C:
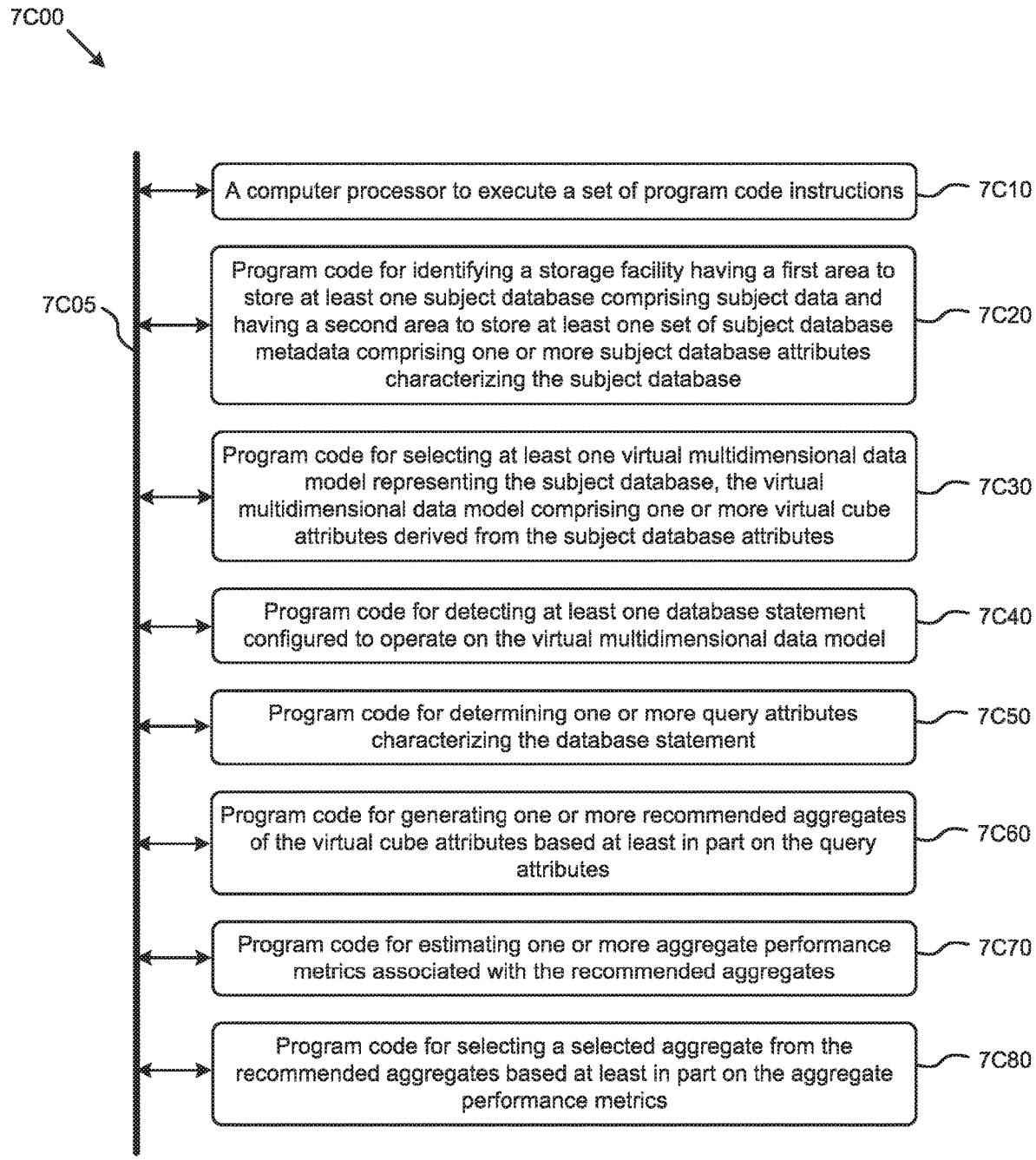

FIG. 7C depicts a block diagram of a system to perform certain functions of a computer system. As an option, the present system 7C00 may be implemented in the context of the architecture and functionality of the embodiments described herein. Of course, however, the system 7C00 or any operation therein may be carried out in any desired environment. The system 7C00 comprises at least one processor and at least one memory, the memory serving to store program instructions corresponding to the operations of the system. As shown, an operation can be implemented in whole or in part using program instructions accessible by a module. The modules are connected to a communication path 7C05, and any operation can communicate with other operations over communication path 7C05. The modules of the system can, individually or in combination, perform method operations within system 7C00. Any operations performed within system 7C00 may be performed in any order unless as may be specified in the claims. The shown embodiment in FIG. 7C implements a portion of a computer system, shown as system 7C00, comprising a computer processor to execute certain program code instructions (see module 7C10) and modules for accessing memory to hold program code instructions to perform: identifying a storage facility having a first area to store at least one subject database comprising subject data and having a second area to store at least one set of subject database metadata comprising one or more subject database attributes characterizing the subject database (see module 7C20); selecting at least one virtual multidimensional data model representing the subject database, the virtual multidimensional data model comprising one or more virtual cube attributes derived from the subject database attributes (see module 7C30); detecting at least one database statement configured to operate on the virtual multidimensional data model (see module 7C40); determining one or more query attributes characterizing the database statement (see module 7C50); generating one or more recommended aggregates of the virtual cube attributes based at least in part on the query attributes (see module 7C60); estimating one or more aggregate performance metrics associated with the recommended aggregates (see module 7C70); and selecting a selected aggregate from the recommended aggregates based at least in part on the aggregate performance metrics (see module 7C80).

System Architecture Overview

Additional System Architecture Examples

Figure 8A:
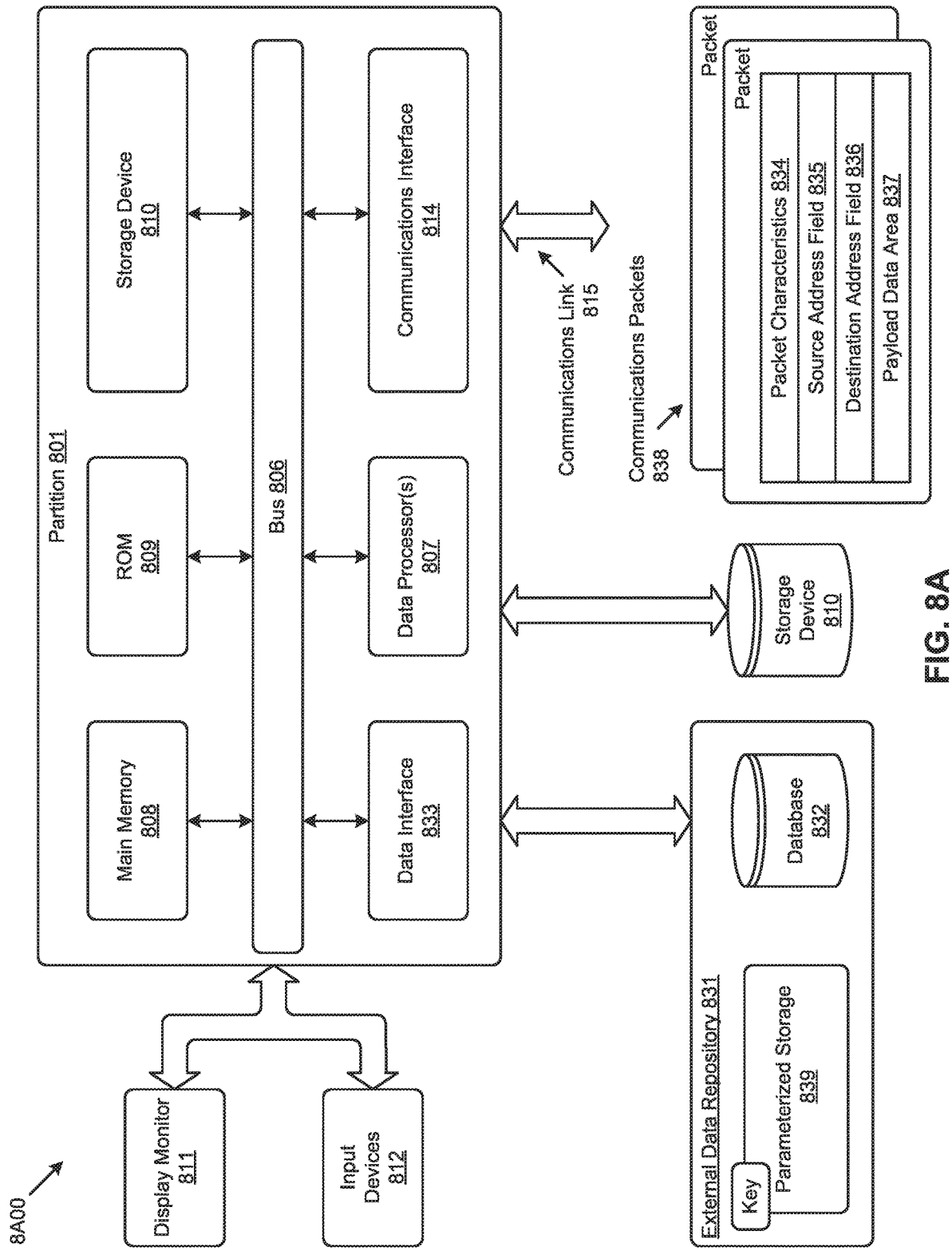
FIG. 8A and FIG. 8B depict exemplary architectures of components suitable for implementing embodiments of the present disclosure, and/or for use in the herein-described environments.

FIG. 8A depicts a block diagram of an instance of a computer system 8A00 suitable for implementing embodiments of the present disclosure. Computer system 8A00 includes a bus 806 or other communication mechanism for communicating information, which interconnects subsystems and devices such as a processor 807, a system memory (e.g., main memory 808, or an area of random access memory RAM), a static storage device (e.g., ROM 809), an internal or external storage device 810 (e.g., magnetic or optical), a data interface 833, a communication interface 814 (e.g., PHY, MAC, Ethernet interface, modem, etc.), a display 811 (e.g., CRT or LCD), input devices 812 (e.g., keyboard, cursor control), and an external data repository 831.

According to an embodiment of the disclosure, computer system 8A00 performs specific operations by processor 807 executing one or more sequences of one or more instructions contained in system memory. Such instructions may be read into system memory from another computer readable/usable medium such as a static storage device or a disk drive. The sequences can be organized to be accessed by one or more processing entities configurable to execute a single process or configurable to execute multiple concurrent processes to perform work. A processing entity can be hardware-based (e.g., involving one or more cores) or software-based or can be formed using a combination of hardware and software that implements logic, and/or can carry out computations and/or processing steps using one or more processes and/or one or more tasks and/or one or more threads or any combination therefrom.

According to an embodiment of the disclosure, computer system 8A00 performs specific networking operations using one or more instances of communication interface 814. Instances of the communication interface 814 may comprise one or more networking ports that are configurable (e.g., pertaining to speed, protocol, physical layer characteristics, media access characteristics, etc.) and any particular instance of the communication interface 814 or network access port thereto can be configured differently from any other particular instance. Portions of a communication protocol can be carried out in whole or in part by any instance of the communication interface 814, and data (e.g., packets, data structures, bit fields, etc.) can be positioned in storage locations within communication interface 814, or within system memory, and such data can be accessed (e.g., using random access addressing, or using direct memory access DMA, etc.) by devices such as processor 807.

The communications link 815 can be configurable to transmit (e.g., send, receive, signal, etc.) communications packets 838 comprising any organization of data items. The data items can comprise a payload data area 837, a destination address 836 (e.g., a destination IP address), a source address 835 (e.g., a source IP address), and can include various encodings or formatting of bit fields to populate the shown packet characteristics 834. In some cases the packet characteristics 834 include a version identifier, a packet or payload length, a traffic class, a flow label, etc. In some cases the payload data area 837 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to processor 807 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data. Such data can be stored, for example, in any form of external data repository 831, which in turn can be formatted into any one or more storage areas, and which can comprise parameterized storage 839 accessible by a key (e.g., filename, table name, block address, offset address, etc.).

In an embodiment of the disclosure, execution of the sequences of instructions to practice the disclosure is performed by a single instance of the computer system 8A00. According to certain embodiments of the disclosure, two or more instances of computer system 8A00 coupled by a communications link 815 (e.g., LAN, PTSN, or wireless network) may perform the sequence of instructions required to practice embodiments of the disclosure using two or more instances of components of computer system 8A00.

The computer system 8A00 may transmit and receive messages, data, and instructions including programs (e.g., application code), through communications link 815 and communication interface 814. Received program code may be executed by processor 807 as it is received and/or stored in the shown storage device or in or upon any other non-volatile storage for later execution. Computer system 8A00 may communicate through a data interface 833 to a database 832 on an external data repository 831. Data items in a database can be accessed using a primary key (e.g., a relational database primary key).

The partition 801 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configurable to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a processor 807. Some embodiments include one or more special-purpose hardware components (e.g., power control, logic, sensors, transducers, etc.). A module may include one or more state machines and/or combinational logic used to implement or facilitate the performance characteristics of dynamic aggregate generation and updating for high performance querying of large datasets.

Various implementations of the database 832 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of dynamic aggregate generation and updating for high performance querying of large datasets). Such files or records can be brought into and/or stored in volatile or non-volatile memory.

Figure 8B:
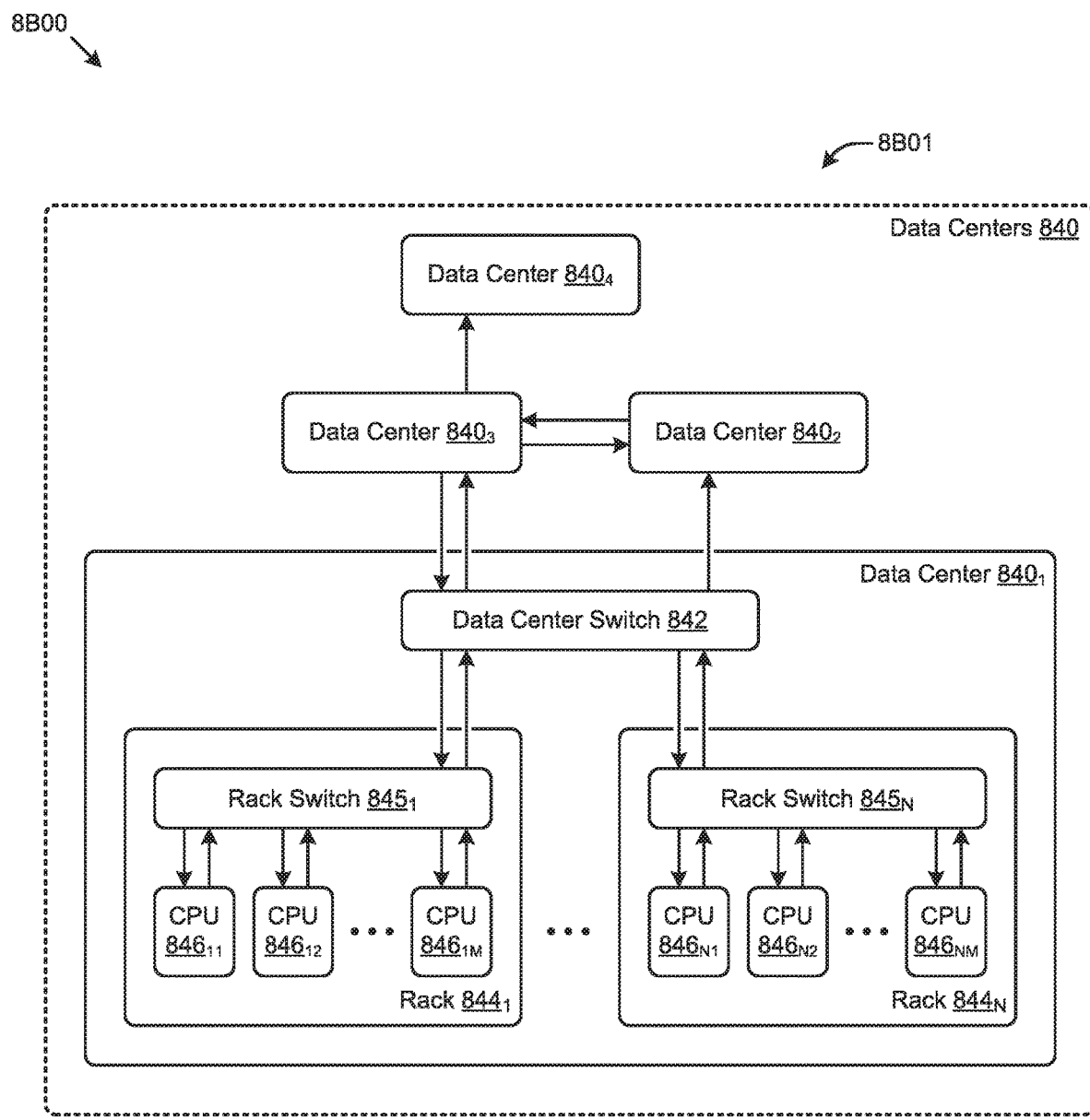

FIG. 8B depicts a block diagram 8B00 of an instance of a distributed data processing system 8B01 that may be included in a system implementing instances of the herein-disclosed embodiments. Distributed data processing system 8B01 may include many more or fewer components than those shown. The distributed data processing system 8B01 is used to store data, perform computational tasks, and transmit data between a plurality of data centers 840 (e.g., data center 840$_1$, data center 840$_2$, data center 840$_3$, and data center 840$_4$). The distributed data processing system 8B01 may include any number of data centers. Some of the plurality of data centers 840 may be located geographically close to each other, and others may be located far from the other data centers.

The components of distributed data processing system 8B01 may communicate using dedicated optical links or other dedicated communication channels, and supporting hardware such as modems, bridges, routers, switches, wireless antennas and towers, and the like. In some embodiments, the component interconnections of the distributed data processing system 8B01 include one or more wide area networks (WANs) as well as one or more local area networks (LANs). In some embodiments, the distributed data processing system 8B01 utilizes a private network, such that a portion or all of the component interconnections of the distributed data processing system 8B01 are designed and operated exclusively for a particular company or customer. Alternatively, a public network may be used.

In some embodiments, each data center includes multiple racks that each include frames and/or cabinets into which computing devices can be mounted. For example, as shown, data center 840$_1$ includes a plurality of racks (e.g., rack 844$_1$ to rack 844$_N$), each comprising one or more computing devices. More specifically, rack 844$_1$ includes a first plurality of CPUs (e.g., CPU 846$_{11}$, CPU 846$_{12}$, to CPU 846$_{1M}$), and rack 844$_N$ includes an Nth plurality of CPUs (e.g., CPU 846$_{N1}$, CPU 846$_{N2}$, to CPU 846$_{NM}$). The plurality of CPUs can include data processors, network attached storage devices, and other computer controlled devices. In some embodiments, at least one of the plurality of CPUs operates as a master processor, and controls the scheduling and data distribution and processing tasks performed throughout the distributed data processing system 8B01. In some embodiments, one or more of the plurality of CPUs may take on one or more roles, such as a master and/or slave. One or more of the plurality of racks can further include storage (e.g., one or more network attached disks) that is shared by the one or more of the plurality of CPUs.

In some embodiments, the CPUs within a respective rack are interconnected by a rack switch. For example, the CPUs in rack 844$_1$ are interconnected by a rack switch 845$_1$, and the CPUs in rack 844$_N$ are interconnected by a rack switch 845$_N$. Further, the plurality of racks within data center 840$_1$ are interconnected by a data center switch 842. The distributed data processing system 8B01 can be implemented using other arrangements and partitioning of multiple interconnected processors, racks, and switches. For example, in some embodiments, the plurality of CPUs can be replaced by a single large-scale multiprocessor.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings to be regarded in an illustrative sense rather than in a restrictive sense.

What is claimed is:

1. A method comprising:
   receiving a set of database query statements applied to a virtual multi-dimensional data model representing a subject database, the virtual multidimensional data model comprising virtual cube attributes derived from at least a portion of subject database metadata associated with the subject database;
   generating a set of aggregate performance metrics associated with a set of recommended aggregates, each aggregate in the set of recommended aggregates in the form of programming code including instructions constructing a logic plan for processing;
   selecting an aggregate from the set of recommended aggregates based on the set of aggregate performance metrics, the selected aggregate representing a set of raw data in the subject database referenced by one or more of the virtual cube attributes based on the database query statements, the selected aggregate including a first of number of objects derived from the set of raw data, the first number of objects being fewer than a second number of objects associated with the set of raw data;
   deriving an aggregate plan from the selected aggregate, including selecting the aggregate in advance of the aggregate being used by the aggregate plan to satisfy a query request defined by the database query statements; and
   executing the aggregate plan.

2. The method as in claim 1 further comprising:
   generating a set of aggregate tables including a set of aggregated data corresponding to the selected aggregate; and
   generating a set of aggregate metadata including aggregate attributes characterizing the set of aggregate tables.

3. The method as in claim 2 further comprising:
generating an aggregate object corresponding to the selected aggregate, the aggregate object used to develop a subject database query that accesses the set of aggregate tables and the set of aggregate metadata.

4. The method as in claim 1 further comprising:
generating the set of recommended aggregates based on query attributes derived from the set of database query statements.

5. The method as in claim 1, wherein executing the aggregate plan includes:
executing an aggregate database query, the aggregate database query including subject database queries configured to operate on the subject database; and
returning an aggregate result set.

6. The method as in claim 5 further comprising:
via the returned aggregate result set:
generating a set of aggregate tables including a set of aggregated data corresponding to the selected aggregate;
generating a set of aggregate metadata including aggregate attributes characterizing the set of aggregate tables; and
generating an aggregate object corresponding to the selected aggregate, the aggregate object used to develop a subject database query that accesses the set of aggregate tables and the set of aggregate metadata.

7. The method as in claim 1, further comprising:
receiving a signal to update the selected aggregate;
identifying attributes pertaining to an aggregate update;
generating an aggregate plan from the identified attributes describing the aggregate update; and
executing the aggregate plan.

8. A method comprising:
identifying a storage facility having a first area to store at least one subject database comprising subject data and having a second area to store at least one set of subject database metadata comprising one or more subject database attributes characterizing the subject database;
selecting at least one virtual multidimensional data model representing the subject database, the virtual multidimensional data model comprising one or more virtual cube attributes derived from the subject database attributes;
detecting at least one database statement configured to operate on the virtual multidimensional data model;
determining one or more query attributes characterizing the database statement;
generating one or more recommended aggregates of the virtual cube attributes based at least in part on the query attributes, the generated aggregate including a first of number of objects derived from the set of raw data, the first number of objects being fewer than a second number of objects associated with the set of raw data;
estimating one or more aggregate performance metrics associated with the recommended aggregates, each aggregate in the set of recommended aggregates in the form of programming code including instructions constructing a logic plan for processing; and
selecting a selected aggregate from the recommended aggregates based at least in part on the aggregate performance metrics;

deriving an aggregate plan from the selected aggregate, including selecting the aggregate in advance of the aggregate being used by the aggregate plan to satisfy a query request defined by the database query statements; and
executing the aggregate plan.

9. A system comprising:
a network access port;
an aggregation engine operable to receive communications over the network access port, the aggregation engine operable to:
receive a set of database query statements applied to a virtual multi-dimensional data model representing a subject database, the virtual multidimensional data model comprising virtual cube attributes derived from at least a portion of subject database metadata associated with the subject database;
generate a set of aggregate performance metrics associated with a set of recommended aggregates, each aggregate in the set of recommended aggregates in the form of programming code including instructions constructing a logic plan for processing;
select an aggregate from the set of recommended aggregates based on the set of aggregate performance metric, the selected aggregate representing a set of raw data in the subject database referenced by one or more of the virtual cube attributes based on the database query statements, the selected aggregate including a first of number of objects derived from the set of raw data, the first number of objects being fewer than a second number of objects associated with the set of raw data;
derive an aggregate plan from the selected aggregate, including selecting the aggregate in advance of the aggregate being used by the aggregate plan to satisfy a query request defined by the database query statements; and
execute the aggregate plan.

10. The system as in claim 9 wherein:
the selected aggregate includes a first of number of objects derived from the set of raw data, the first number of objects being fewer than a second number of objects associated with the set of raw data.

11. The system as in claim 9, wherein the aggregation engine is further operative to:
generate a set of aggregate tables including a set of aggregated data corresponding to the selected aggregate; and
generate a set of aggregate metadata including aggregate attributes characterizing the set of aggregate tables.

12. The system as in claim 11, wherein the aggregation engine is further operative to:
generate an aggregate object corresponding to the selected aggregate, the aggregate object used to develop a subject database query that accesses the set of aggregate tables and the set of aggregate metadata.

13. The system as in claim 9, wherein the aggregation engine is further operative to:
generate the set of recommended aggregates based on query attributes derived from the set of database query statements.

14. The system as in claim 9, wherein the aggregation engine is further operative to:
execute an aggregate database query, the aggregate database query including subject database queries configured to operate on the subject database; and
return an aggregate result set.

15. The system as in claim 14, wherein the aggregation engine is further operative to:
via the returned aggregate result set:
generate a set of aggregate tables including a set of aggregated data corresponding to the selected aggregate;
generate a set of aggregate metadata including aggregate attributes characterizing the set of aggregate tables; and
generate an aggregate object corresponding to the selected aggregate, the aggregate object used to develop a subject database query that accesses the set of aggregate tables and the set of aggregate metadata.

16. The system as in claim 9, wherein the aggregation engine is further operative to:
receive a signal to update the selected aggregate;
identify attributes pertaining to an aggregate update;
generate an aggregate plan from the identified attributes describing the aggregate update; and
execute the aggregate plan.

17. A computer program product embodied in a non-transitory computer readable medium, the non-transitory computer readable medium having stored thereon a sequence of instructions which, when stored in memory and executed by a processor causes the processor to:
receive a set of database query statements applied to a virtual multi-dimensional data model representing a subject database, the virtual multidimensional data model comprising virtual cube attributes derived from at least a portion of subject database metadata associated with the subject database;
generate a set of aggregate performance metrics associated with a set of recommended aggregates, each aggregate in the set of recommended aggregates in the form of programming code including instructions constructing a logic plan for processing;
select an aggregate from the set of recommended aggregates based on the set of aggregate performance metric, the selected aggregate representing a set of raw data in the subject database referenced by one or more of the virtual cube attributes based on the database query statements, the selected aggregate including a first of number of objects derived from the set of raw data, the first number of objects being fewer than a second number of objects associated with the set of raw data;
derive an aggregate plan from the selected aggregate, including selecting the aggregate in advance of the aggregate being used by the aggregate plan to satisfy a query request defined by the database query statements; and
execute the aggregate plan.

* * * * *